(12) United States Patent
Todd

(10) Patent No.: US 9,743,119 B2
(45) Date of Patent: Aug. 22, 2017

(54) VIDEO DISPLAY SYSTEM

(71) Applicant: Skreens Entertainment Technologies, Inc., Foxboro, MA (US)

(72) Inventor: Marc Todd, Foxboro, MA (US)

(73) Assignee: Skreens Entertainment Technologies, Inc., Foxboro, MA (US)

( * ) Notice: Subject to any disclaimer, the term of this patent is extended or adjusted under 35 U.S.C. 154(b) by 6 days.

(21) Appl. No.: 15/056,086

(22) Filed: Feb. 29, 2016

(65) Prior Publication Data
US 2016/0182924 A1 Jun. 23, 2016

Related U.S. Application Data

(63) Continuation of application No. PCT/US2014/053491, filed on Aug. 29, 2014, and a
(Continued)

(51) Int. Cl.
*H04N 21/2343* (2011.01)
*H04N 5/45* (2011.01)
(Continued)

(52) U.S. Cl.
CPC ........ *H04N 21/2343* (2013.01); *H04N 5/45* (2013.01); *H04N 21/25875* (2013.01);
(Continued)

(58) Field of Classification Search
CPC ......... H04N 21/2343; H04N 21/25875; H04N 21/2665; H04N 21/4312;
(Continued)

(56) References Cited

U.S. PATENT DOCUMENTS

| 5,495,576 A | 2/1996 | Ritchey et al. |
| 6,166,736 A | 12/2000 | Hugh |

(Continued)

FOREIGN PATENT DOCUMENTS

| EP | 1848212 A2 | 10/2007 |
| WO | 2013163291 A1 | 10/2013 |

(Continued)

OTHER PUBLICATIONS

U.S. Appl. No. 15/383,948, filed Dec. 19, 2016, Pending.
(Continued)

*Primary Examiner* — Nathan Flynn
*Assistant Examiner* — Caroline Somera
(74) *Attorney, Agent, or Firm* — GTC Law Group PC & Affiliates

(57) ABSTRACT

Disclosed herein are video display systems and methods. An exemplary video display system includes a computerized media processing unit configured to receive content including video, audio, graphics and internet content from a plurality of content source devices providing such content and configured to output a blended video signal receivable by a display device; and wherein the video signal output by the media processing unit comprises a plurality of arbitrarily shaped video containers all displayable on the display device simultaneously, each of the plurality of video containers capable of being positioned and displaying video content independent of the video content of the other video containers; wherein the video content displayed in one container may comprise a GUI for control of size and position of each of the other of the plurality of video containers in response to user commands.

21 Claims, 18 Drawing Sheets

Related U.S. Application Data continuation-in-part of application No. 14/871,535, filed on Sep. 30, 2015, now Pat. No. 9,571,866, which is a continuation of application No. 13/454,610, filed on Apr. 24, 2012, now Pat. No. 9,210,361.

(60) Provisional application No. 61/872,095, filed on Aug. 30, 2013.

(51) Int. Cl.

| | | |
|---|---|---|
| *H04N 21/2665* | (2011.01) | |
| *H04N 21/454* | (2011.01) | |
| *H04N 21/4788* | (2011.01) | |
| *H04N 21/482* | (2011.01) | |
| *H04N 21/6587* | (2011.01) | |
| *H04N 21/258* | (2011.01) | |
| *H04N 21/431* | (2011.01) | |
| *H04N 21/4402* | (2011.01) | |
| *H04N 21/443* | (2011.01) | |
| *H04N 21/45* | (2011.01) | |
| *H04N 21/462* | (2011.01) | |
| *H04N 21/475* | (2011.01) | |
| *H04N 21/485* | (2011.01) | |
| *H04N 21/81* | (2011.01) | |
| *H04N 21/218* | (2011.01) | |
| *H04N 21/478* | (2011.01) | |
| *H04N 21/4786* | (2011.01) | |

(52) U.S. Cl.
CPC ..... *H04N 21/2665* (2013.01); *H04N 21/4312* (2013.01); *H04N 21/4438* (2013.01); *H04N 21/440272* (2013.01); *H04N 21/454* (2013.01); *H04N 21/4532* (2013.01); *H04N 21/4622* (2013.01); *H04N 21/4753* (2013.01); *H04N 21/4788* (2013.01); *H04N 21/482* (2013.01); *H04N 21/4858* (2013.01); *H04N 21/6587* (2013.01); *H04N 21/812* (2013.01); *H04N 21/21805* (2013.01); *H04N 21/4781* (2013.01); *H04N 21/4786* (2013.01)

(58) Field of Classification Search
CPC ....... H04N 21/440272; H04N 21/4438; H04N 21/4532; H04N 21/454; H04N 21/4622; H04N 21/4753; H04N 21/4788; H04N 21/482; H04N 21/4858; H04N 21/6587; H04N 21/812; H04N 21/21805; H04N 21/4781; H04N 21/4786; H04N 5/45
USPC .......................................................... 725/110
See application file for complete search history.

(56) References Cited

U.S. PATENT DOCUMENTS

| | | | |
|---|---|---|---|
| 6,931,660 | B1 | 8/2005 | Kalluri et al. |
| 7,373,414 | B2 | 5/2008 | Evron et al. |
| 8,327,277 | B2 | 12/2012 | Thakkar et al. |
| 8,386,304 | B2 | 2/2013 | Chen et al. |
| 9,210,361 | B2 | 12/2015 | Todd |
| 9,571,866 | B2 | 2/2017 | Todd |
| 2001/0033296 | A1* | 10/2001 | Fullerton .......... G06F 17/30017 715/730 |
| 2005/0066089 | A1 | 3/2005 | Karaoguz et al. |
| 2005/0185711 | A1 | 8/2005 | Pfister et al. |
| 2006/0282785 | A1 | 12/2006 | McCarthy et al. |
| 2007/0024705 | A1 | 2/2007 | Richter et al. |
| 2007/0097206 | A1 | 5/2007 | Houvener et al. |
| 2007/0252912 | A1 | 11/2007 | Valente et al. |
| 2008/0010654 | A1 | 1/2008 | Barrett et al. |
| 2008/0163059 | A1 | 7/2008 | Craner |
| 2008/0239160 | A1 | 10/2008 | Ho et al. |
| 2008/0244641 | A1 | 10/2008 | Ho et al. |
| 2009/0210491 | A1 | 8/2009 | Thakkar et al. |
| 2010/0066677 | A1 | 3/2010 | Garrett et al. |
| 2010/0088634 | A1 | 4/2010 | Tsuruta et al. |
| 2010/0180304 | A1* | 7/2010 | Hassell .............. H04N 5/44591 725/44 |
| 2010/0302348 | A1 | 12/2010 | Richards |
| 2010/0333044 | A1 | 12/2010 | Kethireddy |
| 2011/0004839 | A1 | 1/2011 | Cha et al. |
| 2011/0043696 | A1 | 2/2011 | Onogi et al. |
| 2011/0126255 | A1 | 5/2011 | Perlman et al. |
| 2011/0179436 | A1 | 7/2011 | Candelore |
| 2011/0310221 | A1 | 12/2011 | Meuninck et al. |
| 2012/0151535 | A1 | 6/2012 | Ramdeo |
| 2012/0188233 | A1 | 7/2012 | Shuster et al. |
| 2012/0210350 | A1 | 8/2012 | McCoy et al. |
| 2012/0317598 | A1 | 12/2012 | Gilson |
| 2013/0125171 | A1 | 5/2013 | Sharif-Ahmadi et al. |
| 2013/0278828 | A1 | 10/2013 | Todd |
| 2013/0335407 | A1 | 12/2013 | Reitan et al. |
| 2014/0098185 | A1 | 4/2014 | Davari et al. |
| 2014/0267581 | A1 | 9/2014 | Cronin |
| 2016/0234535 | A1 | 8/2016 | Todd |
| 2016/0269712 | A1 | 9/2016 | Ostrover et al. |

FOREIGN PATENT DOCUMENTS

| | | |
|---|---|---|
| WO | 2015/031802 A1 | 3/2015 |
| WO | PCT/US2016/066924 | 12/2016 |

OTHER PUBLICATIONS 13781615.3, "European Application Serial No. 13781615.3, European Search Report mailed Nov. 26, 2015", Skreens Entertainment Technologies, Inc., 7 Pages.

PCT/US13/37983, "International Application Serial No. PCT/US13/37983, International Search Report and Written Opinion mailed Jun. 19, 2013", Skreens Entertainment Technologies, Inc., 12 pages.

PCT/US2013/037983, "International Application Serial No. PCT/US2013/037983, International Preliminary Report On Patentability With Written Opinion mailed Nov. 6, 2014", Skreens Entertainment Technologies, Inc, 10 Pages.

PCT/US2014/053491, "International Application Serial No. PCT/US2014/053491, International Preliminary Report on Patentability and Written Opinion mailed Mar. 10, 2016", Skreens Entertainment Technologies, Inc., 12 Pages.

PCT/US2014/053491, "International Application Serial No. PCT/US2014/053491, International Search Report and Written Opinion mailed Dec. 9, 2014", Skreens Entertainment Technologies, Inc., 15 Pages.

PCT/US2016/066924, "Application Serial No. PCT/US2016/066924, International Search Report and Written Opinion mailed Mar. 24, 2017.", 7 pages.

* cited by examiner

VIDEO DISPLAY SYSTEM

PRIORITY CLAIM

This application is a continuation of international application PCT/US2014/053491, filed Aug. 29, 2014, and entitled "VIDEO DISPLAY SYSTEM".

PCT/US2014/053491 claims the benefit of the following provisional application: U.S. patent application 61/872,095, filed Aug. 30, 2013.

This application is a continuation-in-part of application Ser. No. 14/871,535 filed on Sep. 30, 2015, which is a continuation of application Ser. No. 13/454,610, filed Apr. 24, 2012, now issued as U.S. Pat. No. 9,210,361 on Dec. 8, 2015.

Each of the above-referenced applications is incorporated by reference in its entirety.

BACKGROUND

Field

The present invention generally relates to the field of video and audio content, control and display, including for television and other display devices.

Description of Related Art

Traditionally, television entertainment has been understood to be one program being displayed on a television or display device like a personal computer (PC) or mobile device. For example, a viewer may watch a movie on a large screen television that is being aired on a television network. The viewer "tunes into" the network by changing a television station or setting a cable box to the network channel. The program is output out of the set top box or other device and displayed on the television with audio. If the viewer wants to see what is on another network, he changes the channel on the cable box (or other) and after a moment the television displays what is being transmitted on that channel or network.

Advertising and program structure is set up to break up the content of a program or movie to place other video messages, such as product advertisement, local advertisement, channel advertisement, government emergency message, and the like. Typically, a viewer watches through the interruption of the movie content and sees the advertisement or other message unless the user changes the channel while the program or movie is at break.

This advertising and single channel viewing set up often causes the behavior of the viewer with the control of the television to start "channel changing" or "flipping" or "channel surfing". Other causes of hyper channel changing typically occur when a viewer wants to see other live events on other channels, a slow or boring section in the video content stream occurs, or for a host of other reasons. Ultimately "channel surfing" is viewer experience driven in their efforts to maximize entertainment or information from the television. This behavior often results in the viewer with the television control being the only person to be able to watch or enjoy the television, often the family or those in the household or group watching the television will disband to separate display devices to "surf" to the video content of their choice, often exhibiting the same behavior.

Television viewing set up, especially for large screen flat panel television viewing, is typically achieved by hooking up various video input devices, such as a DVD player, a cable box, a satellite box, a video game console, an over the top video from the internet (OTT) box, and other inputs to the television. Then, by use of a select input button on the television, the viewer selects the video input device that takes control of the whole television picture. In some models the television allows a "picture in picture" mode where video from two devices can be displayed at one time with one small and one large. This mode offers a bit of control, but not enough to satisfy most users.

The evolving changes in viewer sophistication, especially technical sophistication, combined with significantly increased access to various types and sources of video content has outpaced the ability of the current television viewing and control model. To complicate the picture, often while the viewer is flipping and surfing, he/she is also on a PC, laptop, tablet, smart phone, or other mobile device to operate applications, typically connected to the internet, for further experience.

The entertainment industry including content creators, content providers, service providers, television manufacturers, advertisers and internet companies are all currently limited in the ability to present a combined, easy to use and expandable television presentation that is outside their scope of expertise. Therefore, what is needed is a system that considers all these combined interests and creates a new user experience framework for television viewers.

Large scale, high definition television screens have become widely popular in homes and in various other venues, including entertainment and retail venues. Also, entertainment content sources have proliferated, with a vast range of HD video, Internet and application content available. Some use has been made of "picture-in-picture" features, and some providers have channels that show a mix of the video content from some other channels, allowing a viewer to see what is happening on another channel to allow timely navigation to the other channel; however, a need exists for improved interfaces that allow users more control over the on-screen experience, as well as the methods and systems that enable such interfaces.

SUMMARY

The systems and methods contemplated herein allow for a new generation of entertainment possibility by decoupling the limitation of the video input sources that take control of the entire television screen for single video picture viewer experience. While "picture in picture" is a feature that allows viewing of two video contents on the same television, it is too limited, because there is no ability to multiplex input from more than one video input source (i.e. a cable box and video game console, for example). Moreover, picture in picture does not provide the flexibility required to expand the entertainment potential. The systems and methods herein enable an integration of Internet content and video content. Further, this invention may allow a content creator, distributor, and/or owner to directly engage with an end viewer via internet access over an internet video container at the same time the video content is broadcast. This engagement provides a new infrastructure for new ideas to enhance entertainment, social interaction, advertisements, point of sale, and other benefits for the industry.

In a first embodiment, a system is provided for multiplexing both a plurality of video content (live and/or deferred time) and multiple video access mediums or sources (such as cable television, satellite, video games, DVD players, closed circuit video, internet video such as clips, programming and movies, and the like.) The system achieves this in a viewer friendly manner to enhance entertainment and other entertainment possibilities. The output of a selected video content is seen in a container referred to herein as a video container.

This video container does not necessarily need to fill an entire screen of a display device. A plurality of video containers may be displayed on a television or other display device simultaneously, and may be positioned in various manners, including overlapping one another.

The system may include one or more inputs with access to one or more video programs. The video programs or video content may be live linear content such as broadcast television, cable/satellite stations, and others, from various sources. The video content may also be video on demand content such as movies that get delivered on command from a viewer. The video content could also be delivered over the internet or streaming video. Any video source that can be displayed on a viewing screen including video conferencing and security video could be inputs to the system. Additionally any entertainment media that could be displayed in or on an entertainment device, such as a PC, mobile device or television, could be a video content input; including digital radio, web page interaction, video game input and output and others.

The video container is a logical container that is displayed on the television screen, and is an area where a particular video is played out and viewed. In many embodiments, the video container may be substantially rectangular in shape to match the video content aspect ratios, though the video container may be any shape. The video play out does not exceed the boundary of the video container. In some embodiments, the video container may be sized and resized, in near real-time to form different size bounding rectangles from small to as large as the screen of the display device. Preferably, the video picture may scale to fit the bounding rectangle of the video container. Moreover, in some embodiments, the video container may be positioned and repositioned in near real-time to put the frame of the rectangle in viewer selectable position on the television screen, including overlapping other video containers.

The video container may also have many properties that include but are not limited to: video container type (global video container, sports video container, movie video container, or web video container, etc.), a content filter, a list of channels with location, point of sale data (like credit card info), permissions for viewer log-in, and others. These properties allow particular video containers to be programmed with properties, and repeatedly accessed, which may enhance a user experience.

In one embodiment, the properties of the video container may allow a viewer to confine and control content type in a particular video container, which may enhance ease of use. For example, instead of "surfing" though an entire channel guide to find any sporting events, a video container could be configured with a filter to display only live sporting events across all input services. In another example, a video container may be configured to show only network news programming. In these embodiments, video container configurations may allow the viewer to quickly view all sports or news programs to find one of interest.

Video containers are independent from each other. Therefore, multiple video containers may be sized and positioned by a viewer for better entertainment experience. For example, suppose a viewer wanted to watch a football game, two baseball games, and the news at the same time. The viewer could launch the appropriate video containers for each of the four desired programs, resize and position each in accordance to his needs.

In embodiments, a video display system includes a computerized media processing unit that is configured to receive video content from each of a plurality of different source devices, such as a cable set top box, a satellite set top box, a gaming station, a streaming video set top box, a DVD player, a computing device such as a PC, laptop, tablet, or smart phone, or any device that provides output for a television, such as in HDMI format or an internet packet compressed streaming format, or the like. The media processing unit is configured to aggregate and blend different selected video content from the different source devices to generate as output a blended video signal in HDMI format which is receivable by a television. One of the source devices may be a network computing device that is configured to run a web-based application that provides access to internet video content to the media processing unit, provides a graphical user interface for the video display system, and provides control instructions to the media processing unit. The graphical user interface allows a user to select content from one or more of the source devices to view on the television.

The video signal output by the media processing unit may comprise a plurality of video containers all displayable on the television simultaneously with variable size and variable position, such as under the control of a user, wherein each of the plurality of video containers is capable of simultaneously displaying respective video content from one of the plurality of source devices, independent of the size, position, and video content of the other video containers. A video content displayable in a background video container on the television may comprise the graphical user interface. The media processing unit is configured to control the size and position of each of the other video containers on the background container in response to control instructions of the web-based application. These control instructions may take the form of programmed instructions of the web-based application (such as a predetermined or default layout of video containers) or user interactions with the graphical user interface to control the size and/or position of each container.

The web-based application may run in a web browser of the network computing device, or may be a native application running on the network computing device, or may be an HTML, HTML5, java, javascript, Adobe or Adobe flash application. In embodiments, the network computing device may be a personal computer, a laptop computer, a tablet, a smart phone, or the like. The graphical user interface may be displayed on the television or may be displayed on the network computing device running the web-based application, on another computing device, or on one of the source devices providing content to the system. In embodiments, the graphical user interface may be displayed on the television and mirrored in a computing device separate from the television for control of the size and position of at least one of the plurality of video containers in response to user commands to the mirrored graphical user interface. The graphical user interface also controls the selection of content for at least one of the plurality of video containers displayable on the television in response to user commands.

In embodiments, media processing unit may include a FPGA that is reconfigurable. For example, the FPGA can be reconfigured via software that is downloaded over the internet, such as a web portal on the internet, providing the ability to dynamically change a feature set of the hardware of the media processing unit such as to improve speed of blending of the different video sources to produce unique blended video signal outputs to the television.

A formatting module of the media processing unit is configured to resize the content of each of the plurality of video source devices such that it is displayable within a respective video container on the television.

A video container may be resized or repositioned based on activity detected by the web-based application. A background video container may display one or more widgets. A separate input device may be used to provide control commands to the graphical user interface, such as an input device that is associated with a respective one of the plurality of content source devices. A plurality of input devices may be provided, each of the input devices under the control of a respective user for simultaneously controlling a respective one of the plurality of video containers.

In embodiments, a video display system is providing that includes a computerized media processing unit configured to receive video content from each of a plurality of different source devices including at least one of a cable set top box, a satellite set top box, a gaming station, a streaming video set top box, and a DVD player, and at least one network computing device configured to run a web-based application that provides internet video content to the media processing unit, provides a graphical user interface for the video display system, and provides control instructions to the media processing unit, the media processing unit configured to aggregate and blend different selected video content and generate as output the blended video content as a video signal in HDMI format or another format which is receivable by a television or other display device. The video signal output by the media processing unit may comprise a plurality of video containers all displayable on the television simultaneously with variable size and variable position, wherein each of the plurality of video containers is capable of simultaneously displaying respective video content selected from one of the plurality of source devices, independent of the size, position, and video content of the other video containers; and wherein the media processing unit is configured to control the size and position of each of the video containers on the television in response to control instructions of the web-based application, which control instructions comprise at least one of programmed instructions of the web-based application and user interactions with the graphical user interface. In embodiments, the video content displayable in a respective one of the plurality of video containers may comprise a portion of the video content from the respective source device up to the entirety of the video content from that source device.

In embodiments, a video display system may include a television and a network computing device for running a web-based application that provides a graphical user interface for the video display system and access to internet video content; and a computerized media processing unit configured to receive video content from each of a plurality of different source devices, wherein one of the plurality of source devices is the network computing device for providing control instructions to the media processing unit via the web-based application. The media processing unit is configured to aggregate and blend different video content from the different source devices and generate as output the blended video content as a single video signal in a format which is receivable by the television. The video signal output by the media processing unit comprises a plurality of video containers all displayable on the television simultaneously with variable size and variable position, wherein each of the plurality of video containers is capable of simultaneously displaying respective video content from one of the plurality of source devices, independent of the size, position, and video content of the other video containers; and wherein the media processing unit is configured to control the size and position of each video container on the television in response to control instructions of the web-based application, which control instructions comprise at least one of programmed instructions of the web-based application and user interactions with the graphical user interface.

The system contemplated herein may also be configured to allow multiple people to privately listen to an audio of the video container of interest on the television while others watching the same television or other video display can listen to audio from different video containers. In one embodiment, the multiple audio outputs are transmitted via streaming mechanism from the video containers system to mobile devices over communications networks that are connected to the system, as well as private headsets. In one embodiment of operation, different video containers may provide a particular, identifiable audio output channel. A user having a personal headset may connect the headset to an audio device in electronic communication with the system. The audio device may be configured to change channels to provide access to the identifiable audio output channels of each video container. In this way a user may easily access the audio channels of the various video containers. Audio devices may include, but are not limited to computers, cellular phones, devices specifically configured for the present invention, televisions, video game consoles, and the like.

The system contemplated herein may further comprise a video camera, and may be enabled to provide a video conferencing service allowing video communication between two or more users. In one embodiment, the video conferencing service may allow a plurality of users to watch a live broadcast and discuss the broadcast using the video conference system. The video conferencing system may be between two users, or may be between three or more users. In still another embodiment, a security camera feed may be displayed in a video container. In further embodiments utilizing social interaction aspects, a first user may send a video container from his display device to a display device of a second user, allowing the second user to view what the first user is viewing on the sent video container. This feature may be tied into packages such as the video conferencing service.

In one embodiment, properties of a screen may be manipulated by a network computing device. The network computing device is defined broadly herein to include computing devices connected to a network, as well as other input devices such as a remote control, PCs with web page access to a web interface to the container system, body and/or hand motion devices, voice command devices and other control input devices that can be connected to video container system. In one embodiment, the system may be enabled to bring a video container into full screen mode upon command, and may return to a view showing multiple video containers upon command. In another embodiment, the video container system may be configured to have one large video container displayed, and a number of smaller video containers displayed on the same display device. In this embodiment, the system may be configured to allow a video on a smaller video container to be switched with a video on the large video container on command.

Video containers may have many properties to control the bounds of the function the video containers. One such property is the display type. A video container may be a video display type that provides video play out features and functions. Other display types are possible, one such type is an internet type. The internet video container provides the same sizing and position capability but instead of video playout it may perform web based application functions for example: HTML, Java Script, Java applets, etc. This allows a programmable application to be hosted on the internet and to be executed in the internet video container.

For example if a viewer wants to have a video container for all news channels, the video container may have a list of news channels like CNN®, Foxnews®, etc. and would not display or consider other stations like the Disney® Channel because that is not news. The property of the video container may receive video programming across a variety of sources, so for example the news channels may come in through a cable source, a satellite dish source, and an internet source. All of these sources that provide news programming may (or may not—depending on the properties) be displayed in the video container. Another example is a video container is configured to list the top 20 most popular video clips on the internet for the current day. Each time launched the list is refreshed by video containers to find the top clip links for that day.

In one embodiment, a video container and content may be streamed, both audio and video, to a mobile device, PC or other display device. In this embodiment, the video content system may be configured as an integrated video access system providing video access to a plurality of devices simultaneously.

In another embodiment, a single video container system may be operative with a plurality of display devices, the system providing a plurality of different video containers to the different display devices. In a further embodiment, a single control device may control the video container content and layout on all of the plurality of display devices, and may allow transfer of one video container from one display device to another. In one example, a single video container system may be employed at a bar having five large screen televisions. A single control device may control all of the video containers displayed on each of the five televisions. Further, this control device may allow transfer of a video container from a first television to a second television. In a further embodiment, the system may allow the five televisions to act as a single large display and may allow movement of video containers as if the televisions were a single display.

The video container system structure also provides many opportunities to expand advertising strategy and function. Control of video container playout and placement may allow spare television screen space for advertisement. Further, interactive Web video containers may allow direct viewer input for advertisement acknowledgement, purchase of items, point of sale, opinion input and more. Moreover, video or text advertisements may be downloaded during video streaming and displayed in various video containers at different times based on criteria and available display space and video container space. In one embodiment an advertising module may be in communication with the system. The advertising module may provide a video content to the system specifically for advertisements. In further embodiments, a particular video container may be dedicated to the advertising module video content.

The video container system has an optional connection over internet to a video container web site where the viewer may login and setup an account to control features of the video container system. Features may include ability to choose if viewer analytics may be collected and sent to the web account for use for dynamic advertising strategies and other uses. In one embodiment, the viewer analytics may be stored in a data storage module to store viewer data for access by a service provider. This connection from a video container system to a computer in the network also provides the structure to enable social interaction with friends in real-time, views of what friends are watching, what is popular programming from a group of social system users, and sharing of video container settings including lists of popular video content channels from distributed sources.

The present disclosure provides methods and systems that provide users with improved control over what content is displayed on a screen, such as a large format HD or 4k television screen, including providing the ability to manipulate display location, sizing, transparency and other features related to a number of video sources of heterogeneous origin, such as television content, IP-based content, games, applications, and various other types of viewable content. The present disclosure provides, among other things, a video display system for multiplexing a plurality of heterogeneous sources and a plurality of heterogeneous content into flexible, controllable, interactive video containers that are displayed on televisions or other display devices for enhanced entertainment possibilities. In accordance with exemplary and non-limiting embodiments, systems and methods for the simultaneous display and interaction with multiple heterogeneous sources are disclosed.

Also disclosed are methods of programming video containers by a user such that interactions with one container can result in alterations in related video containers; methods of programming video containers using a user interface capable of adjusting the transparency of overlapping video containers that display wide format media from a single media processing unit; methods of programming video containers by providing a user interface having at least four display containers that can be placed and sized via end user interaction. The user interface can control the user experience. In embodiments, the user interface can include a background video container and other video containers can overlay a user interface video container. The user interface may be one of an HTML5 application running on a computing device such as a PC, such as in a web browser or as a native PC application; and the user interface can interact with another application or website to obtain one or more of user preferences, widgets, and store analytics, and the user interface can communicate with a formatting module of a media processing unit to control overlay and appearance of the video container output display.

Additionally, disclosed are methods of enabling an end user to adjust the shape of video containers such the shape of the container is arbitrary, geometric, non-rectangular, or free-form in shape; methods of enabling an end user to blend two or more heterogeneous sources, where at least one source is video content and one is animation content, into a single video container wherein a time sync may be established between the video and the animation; methods of enabling an end user to blend together two or more video streams wherein the end user establishes the synchronization between the two or more video streams. The content of heterogeneous source types may be blended on the fly by relaying them to an output buffer on an FPGA (field programmable gate array) that is a component of a media processing unit.

Also disclosed herein are methods of overlaying blended content within a bounded box region on a display screen that receives output created by a device such as a media processing unit that handles multiple inputs, such as HDMI inputs or an HDMI output stream. A user interface can be provided to allow an end user of a video display system with a display screen to overlay selected content within a bounded region of pixels/video container on the display screen receiving output from a media processing unit that handles multiple inputs, such as HDMI inputs, or an HDMI output stream.

In embodiments, a video display system may allow interaction with displayed video containers using a control interface or components of a native device that can provide a feed to one of the containers.

In embodiments, a video display system may comprise a computerized media processing unit configured to receive at least a plurality of content including at least one of video, audio, graphics and internet content from a plurality of heterogeneous content source types providing such content and configured to output a video signal receivable by a display device; and wherein the video signal output by the media processing unit comprises a plurality of arbitrarily shaped video containers all displayable on the display device simultaneously, each of the plurality of video containers capable of displaying video content independent of the video content of the other video containers; wherein the video content displayed may comprise, at a given instance, a portion of the video content from the source up to the entirety of the video content from the source.

In embodiments, a user interface may be provided which has at least four display containers for display on a video display screen wherein the different containers are capable of playing, at the same time, heterogeneous content types selected from video format content, HDTV format content, packet-based content, video game content and audio content.

In embodiments, a method of inspecting a tag in an output stream created from multiple input streams is disclosed in order to determine what content was displayed on what part of the screen of a display device at a particular time, wherein the output stream can include an HDMI output stream, and the input stream can include HDMI input streams. This information can be used for e-commerce purposes, or to provide_an analytic report based on the use of the device.

In embodiments, methods of tracking can include filtering audio content associated with video content to be displayed wherein the filter suppresses audio content in the human auditory range, summing the filtered audio content with the audio content associated with the video container of primary interest; and sending the combined audio to an audio output device associated with a user.

In embodiments, a video stream can be provided that specifies a related stream of IP-based widgets that display themselves when the video plays. A widget can determine selection of a video stream from multiple possible video streams when the widget is displayed on the video screen. Widget content can be shared with other users in a user-blended HDMI video and IP-TV environment. A widget can be recommended to users for a user-blended, large screen, HDTV environment based on similarity to other users. Video content can be recommended to users for a user-blended, large screen, HDTV environment based on similarity to other users. A personalized, contextual group of widgets that are preferred by a particular user can be organized and displayed based on the context of content displayed on the display screen from an HDMI output device that handles multiple HDMI input streams. A customized user interface can be provided which comprises one or more groups comprising widgets, and internet browser windows, wherein a user is able to flip between groups of widgets. A user interface can be provided which comprises one or more groups of widgets and internet browsers, wherein the selection of widgets within a group may be partially auto populated based on the content of other video containers.

In embodiments, a system for processing multiple heterogeneous data sources having video content wherein the video content comprises meta-data embedded into the image content can include one or more of information about the scene content of the video, links to related internet sites, links to related social networking sites and channels, sales channels, and executable scripts. A transcoder module can extract the meta-data from the image and act on the encoded meta-data according to a rule set.

In embodiments, a media processing unit or video display device may include four or more input ports, one or more output ports, and an FPGA, wherein the input ports may be HDMI input ports, and the output ports may be HDMI output ports. The FPGA may be a single FPGA, wherein the FPGA processes the individual inputs in parallel and writes the processed input to a memory buffer according to placement parameters specified by a formatting module, wherein the contents of the memory buffer are then output using one or more output ports. Hardware may be remotely upgraded using a communications network to upload new images to the FPGA.

The FPGA may be programmable on the fly to enable at least one of selection, blending and overlay logic for output of an HDMI stream to video containers of a display device while managing multiple HDMI input streams.

In embodiments, a custom/ASIC chip may take multiple HDMI inputs and provide a single HDMI output stream, with parallel processing of input streams and a logic module for resizing and handling of overlay information among HDMI input streams.

In embodiments, a video display system handling multiple HDMI inputs and providing a single HDMI output stream may include a synchronization means for handling bit-by-bit competition on overlapping output regions of multiple video containers displayed on a display device. A bounding box of pixel locations may be provided for display of the HDMI output stream of an FPGA to a display device. The system may convert content to feed displays greater than 4k by combining multiple video streams and upconverting to a larger video output stream.

Video display systems described herein may be used for various applications. For example, a system for improved "TTY" communication may be provided which includes two or more video containers wherein at least one video container shows the TTY text and at least one video container shows a person.

In embodiments, a system for closed caption display may be provided wherein the closed captions are displayed in a separate, related video container allowing the end user to scroll back through the closed captions, wherein an interface to the closed caption video container is through a controller or a secondary device such as a tablet or smart phone, and the user may control color and size of font, and position and size of closed caption video container relative to related video.

In embodiments, a display screen may be provided having at least two video containers displayed wherein one video container displays marketing material comprising one or more of advertisements, videos, order forms, surveys, and games relating to the video content in a related video container.

In embodiments, a method of providing and monitoring personalized content as part of a video display system may include a website for storing and serving personalized content including one or more of user preferences, user information, information regarding user hardware, system and configuration information, storing and serving widgets from content vendors based on user preferences and information; and collecting and storing analytics. An user may perform one click shopping at their television as part of the video container environment.

The present disclosure depicts a video display system that allows a new generation of entertainment possibilities by decoupling the limitation of various types of input sources, and related devices, such as set top boxes or video game consoles that each conventionally take control of an entire television screen or display for a single video viewer experience. While "picture in picture" features and mix channels allow viewing of more than one video content stream on the same television screen, these features are conventionally controlled by a single input source device and are very limited, among other things by the absence of the ability for the viewer to choose input from another device source, such as a cable box, video game console, satellite radio internet, DVD, RVU protocol or the like. In order to access other content, a user is typically required to select a different input source device, which then controls the entire display screen. Moreover, picture in picture and mix channels are mainly limited to allowing a user to navigate to particular content in a timely way, not providing the flexibility of the methods and systems disclosed herein.

Systems described herein decouple the display from the plurality of heterogeneous inputs facilitating independent control of one or more of screen layout and video container characteristics, input devices and the like. This control may use a multitude of control devices including one or more of mobile devices such as smartphones, tablets and the like, PCs, remote controls, wireless mouse/keyboard devices and the like. The system may receive input from one or more of these control devices and provides universal remote control functionality enabling the user to control the larger system comprising the display, the video display system, the plurality of input devices, such as set top boxes, video game stations, internet applications, internet set top boxes, video cameras, and the like, In one embodiment, the system is able to accept and process multiple heterogeneous input sources simultaneously and merge them into a combined output stream in which the content of the different input sources may be displayed in video containers having independent and arbitrary positions, sizes, aspect ratios, shapes, relative transparency levels and the like. In a further embodiment the different input sources may be linked such that the content of a video container may influence one or more of the appearance, behavior or available controls of one or more linked video containers. In a variation on the above embodiment, user interactions with a video container or its contents may result in changes in one or more of appearance, behavior or options of linked video containers.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

DETAILED DESCRIPTION

System

Figure 1:
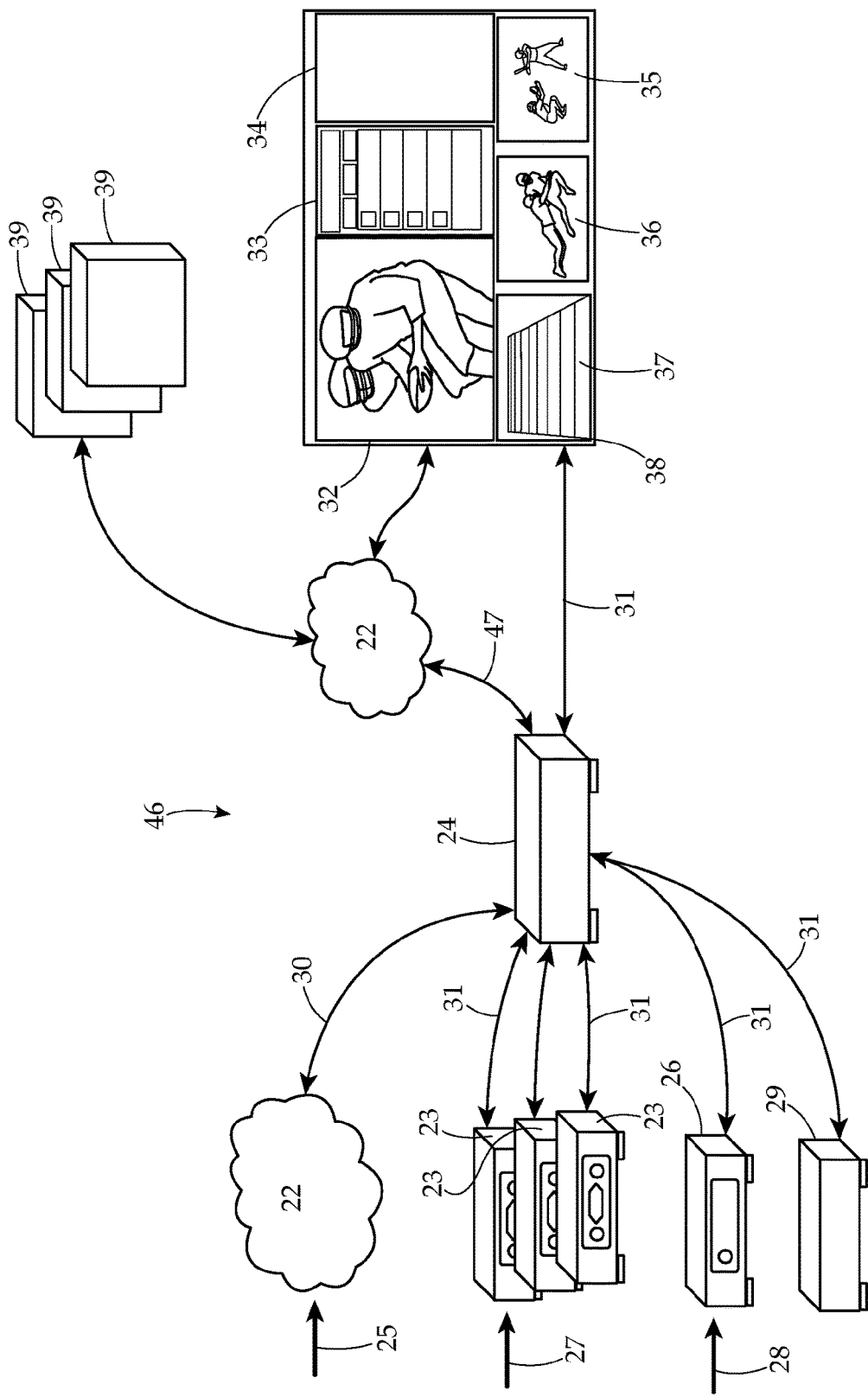
FIG. 1 is a high level illustration of an exemplary video container system.

FIG. 1 illustrates an exemplary embodiment of a video display system 46 for presenting multiple views of content from heterogeneous input sources 25 comprising one or more of audio, video, internet, computer, video game and the like that may be displayed on a television or display device 38 or other display device and presented to one or more viewers. The multiple heterogeneous input sources 25 may be displayed in multiple independent video containers on the television or display device 38 or other display device. In embodiments, the system supports four or more independent video containers on a video display screen wherein the different video containers are capable of simultaneously playing or displaying content from independent, heterogeneous sources, such as from separate sources or source devices. A media processing unit 24 may be configured in whole or in part as a software program that runs on a computer and the corresponding hardware may be implemented entirely in silicon or some combination thereof. The media processing unit 24 takes in content from the multiple heterogeneous input sources 25 and produces a video signal that a television or display device 38 may play for viewers in the various video containers.

Heterogeneous input sources 25 may comprise output from one or more of a set top box 23 receiving video content from a service provider, a DVD or video game console 29, a VHS 32, an internet video device 26 (connected to IP network to Internet 28) such as a web cam, mobile device camera, personal computer camera, surveillance camera, video conference camera, video conference system or other camera, satellite feed, such as for satellite television or radio, connected mobile device such as a tablet, smart phone or other device, local video devices such as a camera or baby monitor, and the like. Content from heterogeneous input sources 25 may be received via IP data streams received via Ethernet, coaxial cable supporting Multimedia over Coax Alliance, MOCA, 802.11, 4G or other transmission means and the like, wherein the IP data stream may be compliant with Universal Plug and Play, UPnP, Digital Living Network Alliance, DLNA, RVU and other guidelines, protocols, standards and the like, over HDMI cable 31, output of a set top box 23, DVD or video game console 29, VHS 32, internet video device 26, local video device, mobile devices such as a tablet or smartphone or the like.

The media processing unit 24 controls the access to the heterogeneous content of heterogeneous input sources 25 by a variety of channel or content selection mechanisms including but not limited to HDMI channel change commands over HDMI cable 31, Multicast IP leave/join over communications network 30, user interactions with a remote control, user interactions with the native control interface of one of the heterogeneous input sources 25, and the like.

The media processing unit 24 takes commands from the viewer or viewers using traditional remote controls, network computing devices 39 such as a mobile device like a tablet or smart phone, a computer, a game controller, a wireless keyboard or the like. The network computing devices 39 are in communication with the media processing unit 24 via a communications network 22. Examples of such commands may be instructions to resize, position, select content, link video containers, manipulate video container properties such as transparency and shape, manipulate web content in video container, interact with local and web based applications and other control functions. Those commands determine how the video container system will select content and present video and audio to the viewer via the output to a television or display device 38. The network computing devices 39 may also provide video content or other displayable content to the media processing unit.

Figure 2:
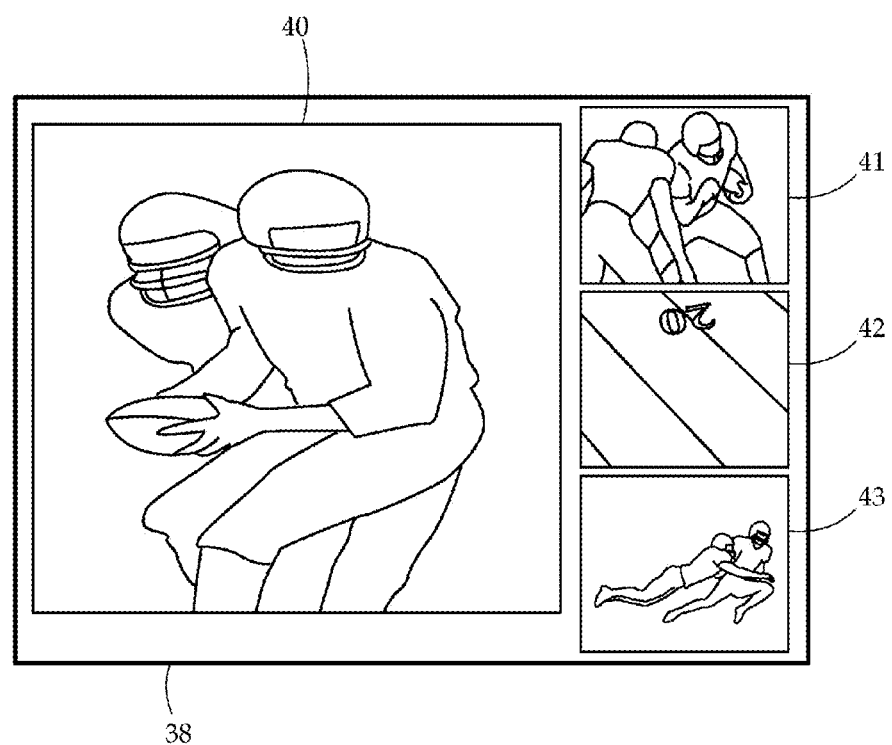
FIG. 2 provides an embodiment of the video container system configured specifically to have four video containers.

FIG. 2 shows an embodiment of video containers configured specifically to have four video containers 43, 42, 41, 40 on a television or display device 38. Video container 40 has a larger size and is positioned on the left side of the television or display device 38. Three smaller video containers 41, 42 and 43 are positioned on a right side of the screen and each show different television channel video content. Video container 40 may have its own properties configured by the user as to what to watch, from which source, etc. In the embodiment shown, video container 40 is showing a particular sporting event. Other sporting events taking place at the same time are shown in video containers 41, 42 and 43. In some embodiments, alternate camera views of the same sporting event may be shown in the smaller video containers 41, 42, 43, thereby providing multiple viewpoints of the sporting event. Alternate camera views may further be employed with other use such as live television content, enhanced movies, and programming configured to present multiple camera views, among others.

Figure 3:
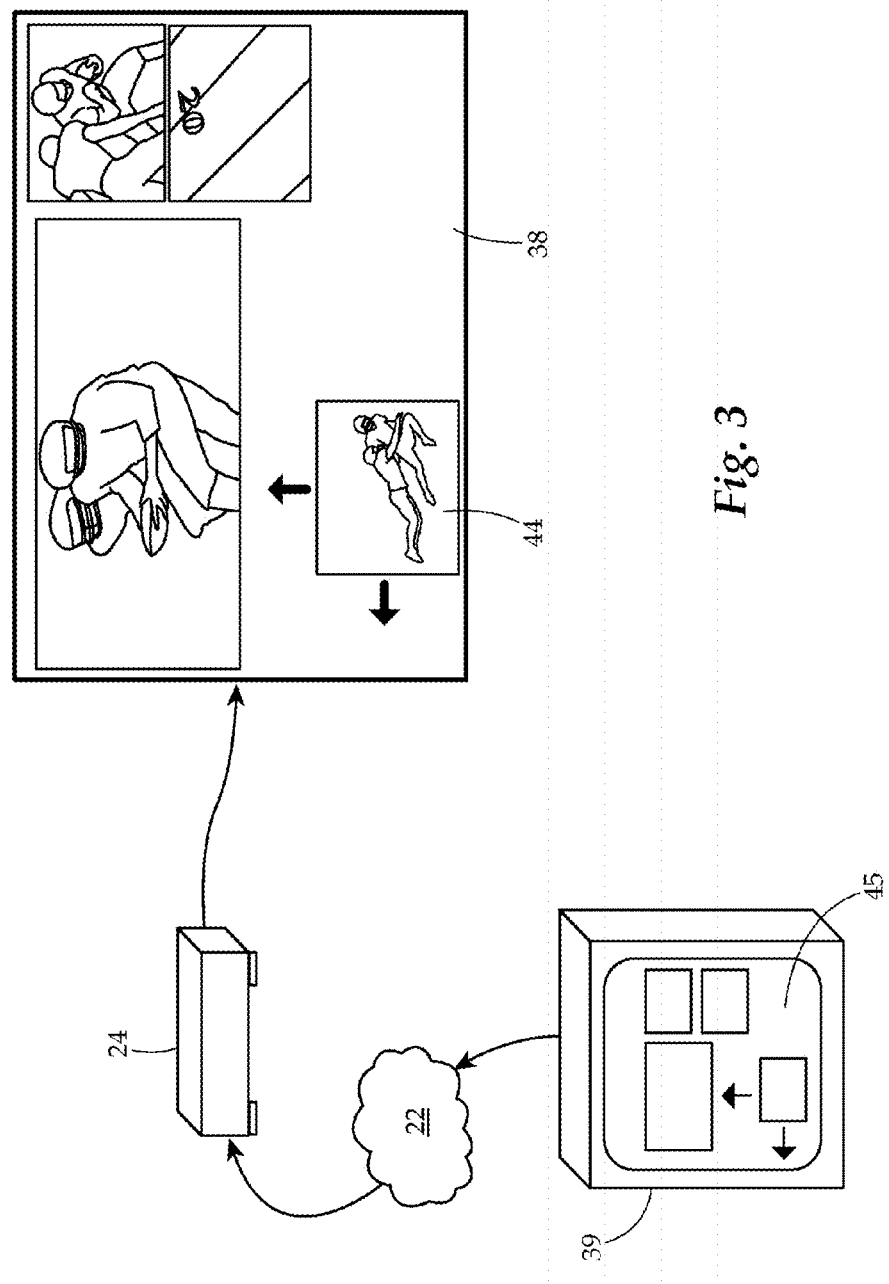
FIG. 3 provides a logical representation of how a video container may be resized and positioned on a television or other display device.

FIG. 3 shows an embodiment of a logical representation of a video container 44 being resized and positioned on a television or display device 38. The network computing device 39 displays the video container bounding box rectangle or video container representation 45. The network computing device 39 such as a mobile or PC device may act as a user interface and allow the viewer or user to resize the video container representation 45 shown on the network computing device 39, then transmits a command over a communications network 22 to the media processing unit 24. The media processing unit 24 then changes the size and position of the video container 44 and matches the video container representation 45 on the television or display device 38. In one embodiment, the network computing device 39 may have a touch screen interface. In this embodiment, a user may utilize the touch screen interface to move the video containers on the display device 38. For example, a user may "pinch" a representation of one video container on the display device 38 to make it smaller. Similarly, a user may touch and "drag" a representation of a video container on the display device 38 to move it across the display device 38.

Figure 4:
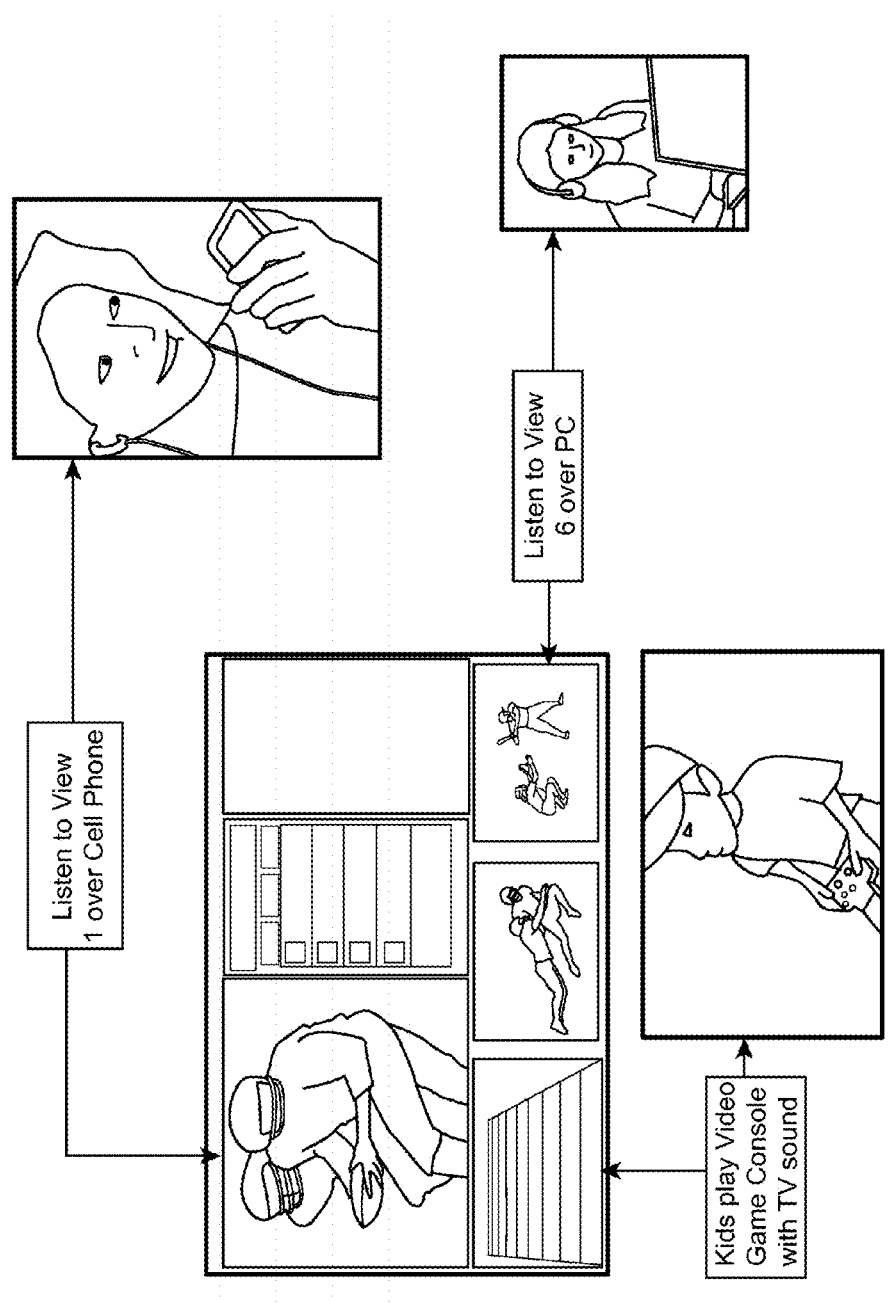
FIG. 4 provides a logical representation of how the video container system allows one or more mobile devices to connect to the system and select an audio of a particular video container on the display device.

FIG. 4 shows a logical representation of an embodiment of the system allowing one or more mobile and/or PC devices to connect to the video container system 46 and receive an audio output corresponding to a particular video content. In this embodiment, a user may select a particular video container view on the television or display device 38. The video containers system can then stream the audio for that video container selected to the mobile or PC device that optionally may have a private audio headset. This may allow many people to listen to different video container content without hearing other video container content. The present embodiment shows a first user listening to view 1 over a cellular phone connected to a headset. A second user is listening to view 6 over a PC connected to a headset. A third user is playing a video game and listening to the sound from the television speakers.

Figure 5:
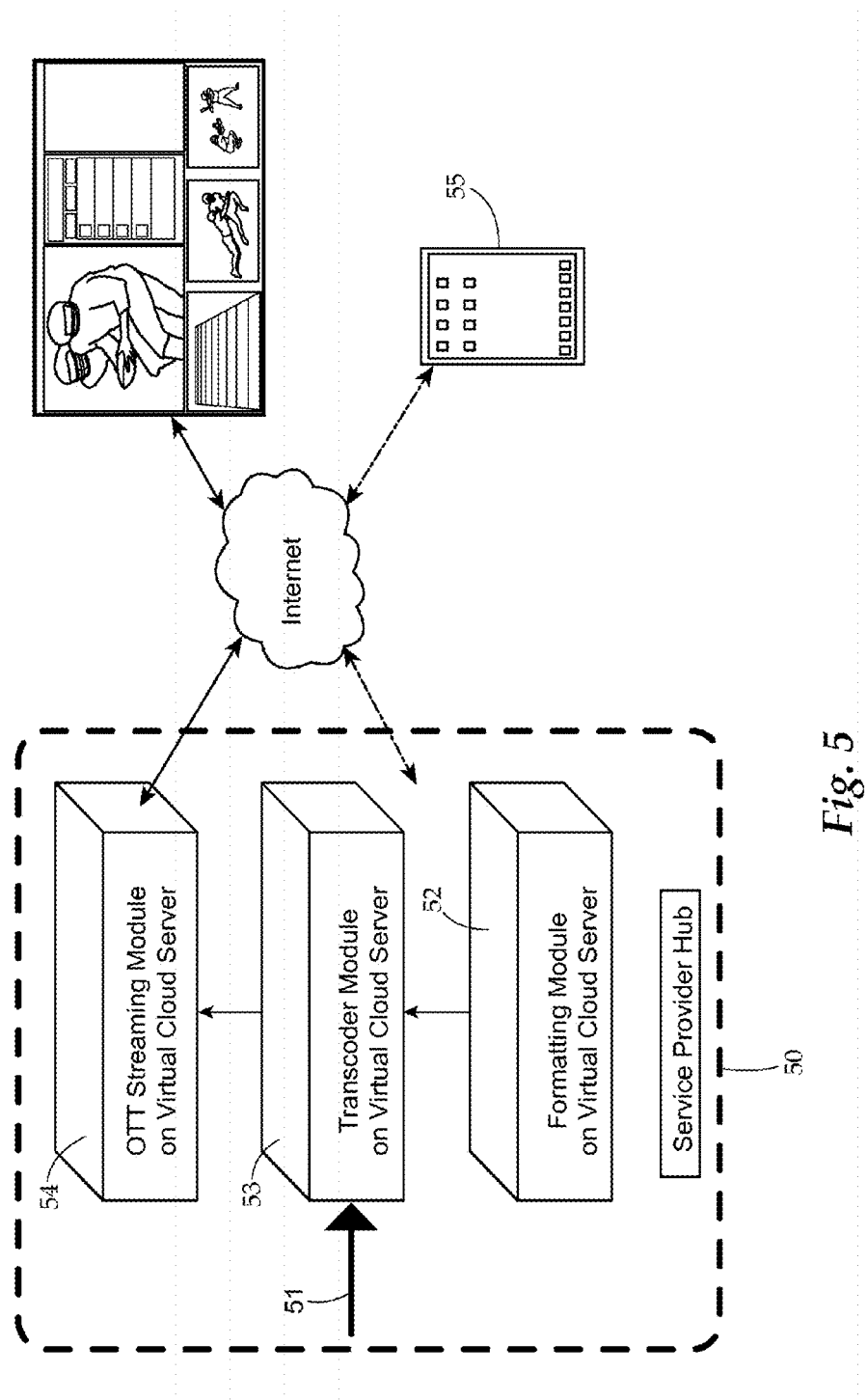
FIG. 5 provides an embodiment wherein the video container system is hosted by a remote server, which then provides video directly to a video device, such as a television or tablet computer.

FIG. 5 shows an embodiment wherein the video container system is hosted by a remote server or "cloud", which then provides video directly to a television or display device 38 such as tablet computer. An offsite service provider hub 50 may receive input video content 51 from one or a plurality of sources. This video may be received into a transcoder module 53. A formatting module 52 may be in communication with the transcoder module 53. The formatting module 52 instructs the transcoder module 53 of what video streams to present, and what the proper format and presentation of video containers is. The transcoder module 53 then receives the video content and instructions and outputs video formatted in various video containers as desired by a remote user. An over the top (OTT) streaming module 54 receives the formatted video container data, and outputs the same in a streaming data output to the internet, or other data connection. An end user may then receive the formatted video over the internet on their television or display device 38. Control of the formatting and video content of the video containers may be achieved by transmitting a signal from a controller 55, over the internet or communications network, to the formatting module 52, which will instruct the transcoder module 53 to change its output, as discussed above. This embodiment may allow centralized control of the system, and may require less hardware and setup for an end user.

Figure 6:
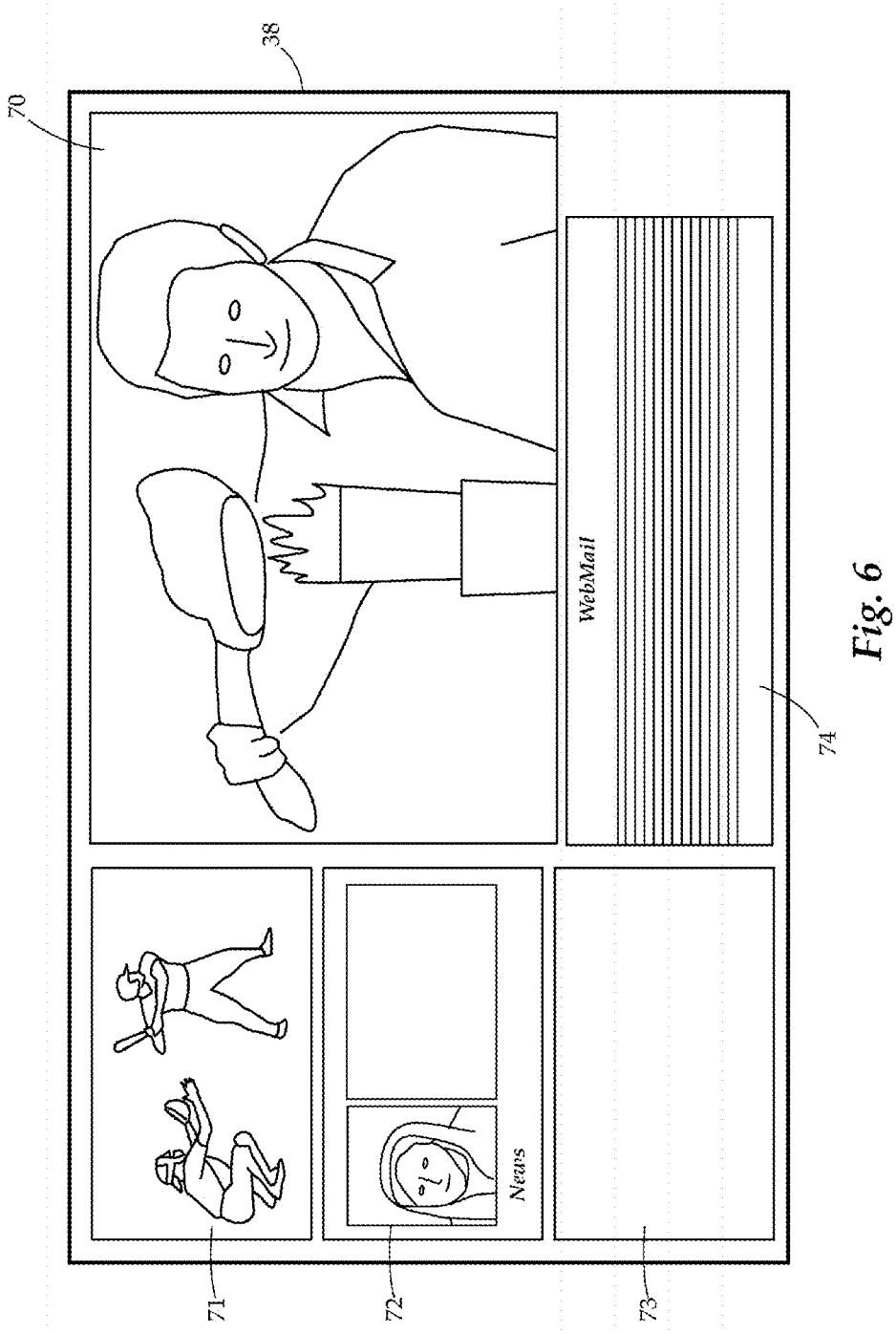
FIG. 6 provides an embodiment demonstrating a variety of video and internet video containers on a single display device—shown here as a television.

FIG. 6 provides an embodiment demonstrating a variety of video and internet video containers on a single display device—shown here as a television or display device 38. A large video container 70 is positioned in an upper right corner of the television or display device 38. The large video container 70 serves as the primary viewing area, and in this embodiment is showing a major network prime-time show. On a left side of the television or display device 38 are three video containers 71, 72, 73, which are smaller than the large video container 70. A top video container 71 displays a sporting event video. A central video container 72 displays a news program, and a bottom video container 73 may be used for "channel surfing" for example to find a video for display in the large video container 70 during a commercial break. Further, at a bottom right portion of the television or display device 38 is an internet video container 74. The internet video container 74 is shown accessing a webmail interface for checking email. This internet embodiment may allow a user to utilize a television as a single unit for internet usage and television viewing, as opposed to a user having multiple devices such as a laptop and television.

It should be noted that the arrangement (including location and possible overlap with other containers), format and configuration of the various video containers 70, 71, 72, and 73 may be varied in any number of ways, and is limited only to the size and technical limitations of the display device.

Figure 7:
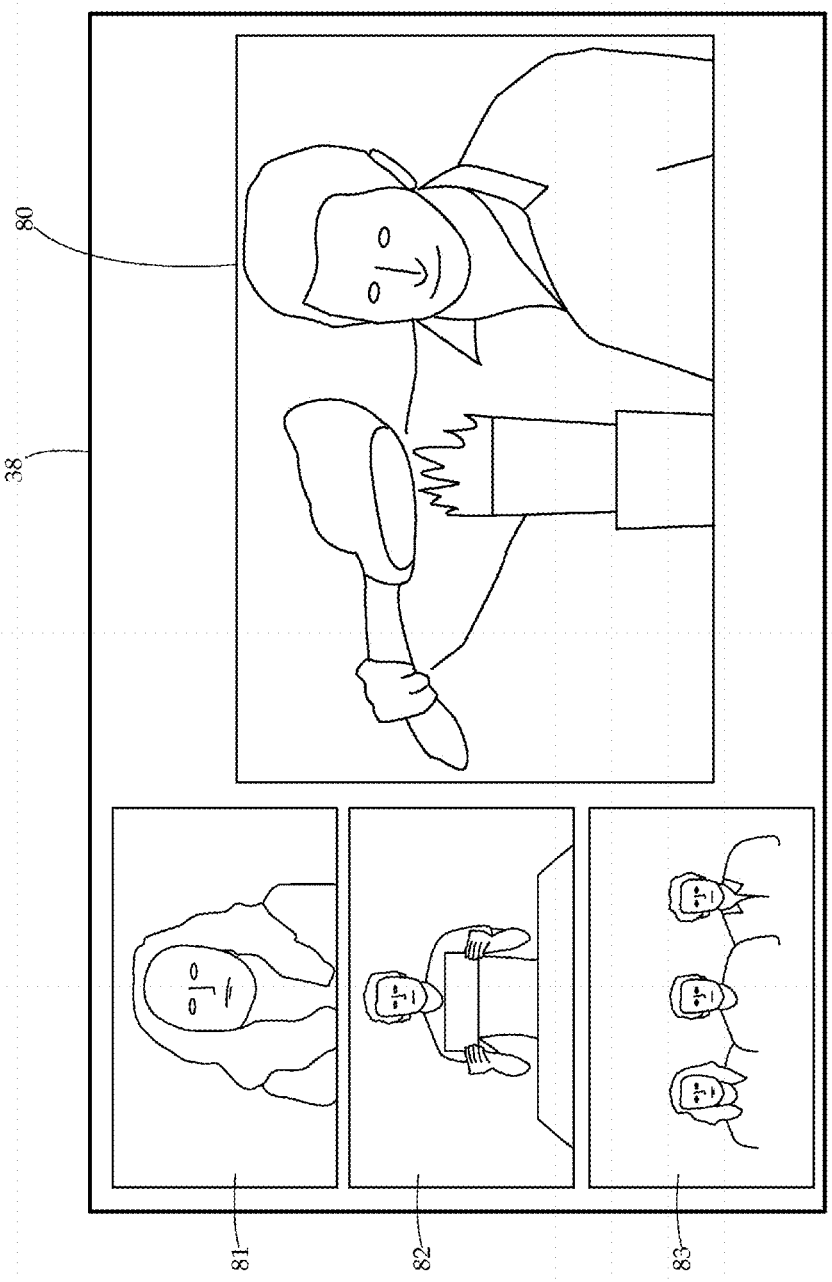
FIG. 7 provides another embodiment of the video container system having a plurality of video containers arranged on a display device—shown in this figure as a television.

FIG. 7 provides an embodiment of the video container system of a plurality of video containers arranged on a display device, shown in this figure as a television or display device 38. The arrangement of FIG. 7 provides video containers all relating to the same program, but from different video sources. A large central video container 80 is positioned at a center right of the television or display device 38. A video content of this video container is a main camera view(s) of a broadcast television show. Three smaller video containers 81, 82 and 83 are positioned at a left side of the television or display device 38. A top video container 81 displays a video from the internet providing an alternative viewpoint from what is displayed on the main program in the central video container 80. In one embodiment, the video container 81 may display viewer video responses to a live broadcast in the central video container 80. A middle video container 82 displays a video displaying a further alternative viewpoint from what is displayed on the main program in the central video container 80. A bottom video container 83 displays a video displaying a further alternative viewpoint from what is displayed on the main program in the central video container 80. The content of the video containers 80, 81, 82, 83 may come from a variety of sources such as a cable feed, internet, satellite dish, pre-recorded content, and the like. Further, the source of the content in the smaller video container 81, 82, 83 may be different from the source of the content in the central video container 80.

Figure 8:
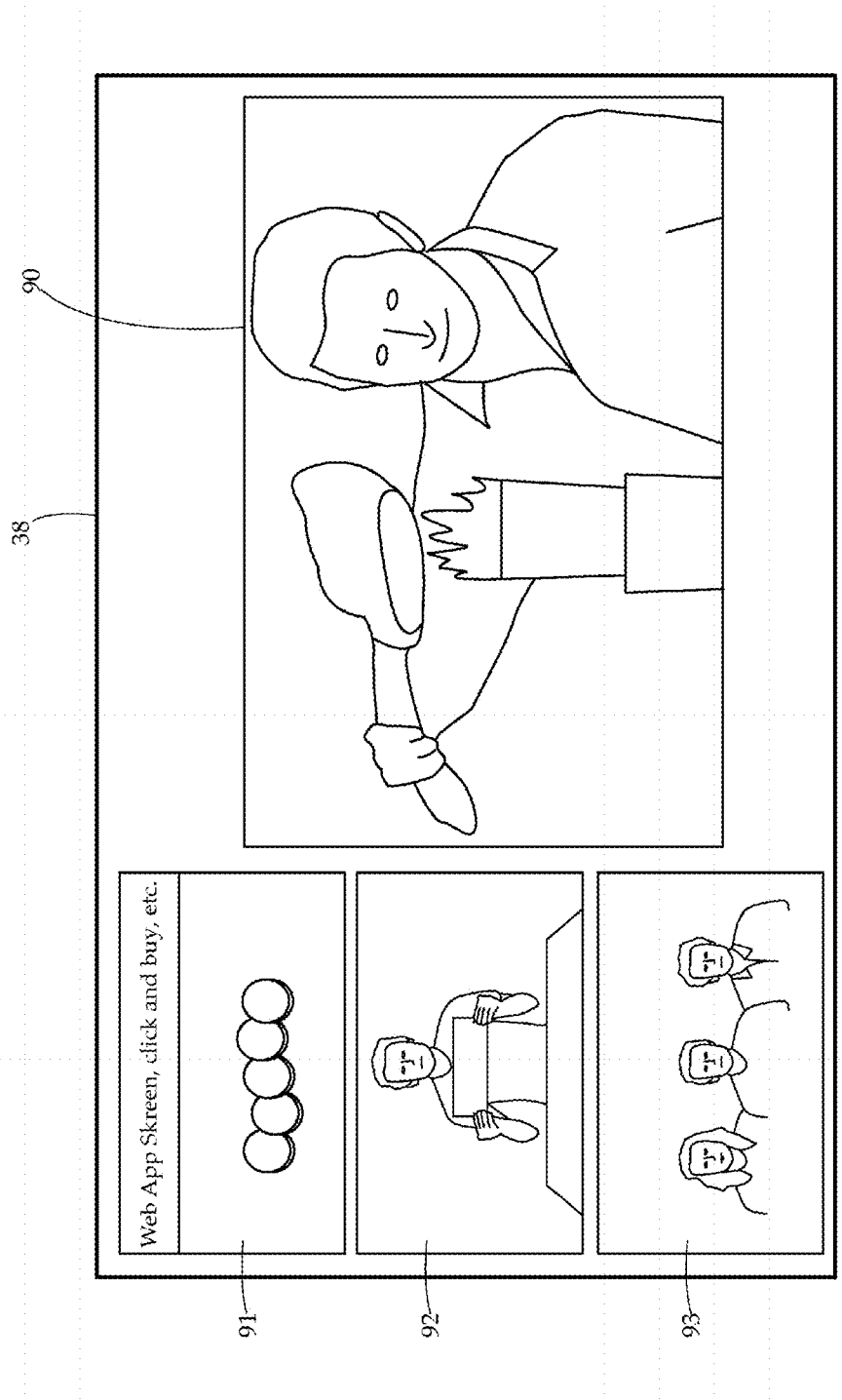
FIG. 8 provides still another embodiment of the video container system having a plurality of video containers arranged on a display device—shown in this figure as a television.

FIG. 8 provides an embodiment of the video container system of a plurality of video containers arranged on a display device, shown in this figure as a television or display device 38. The arrangement of FIG. 8 provides video containers all relating to the same program, but from different video sources. A large central video container 90 is positioned at a center right of the television or display device 38. A video content of this video container is a main camera view(s) of a broadcast television show. Three smaller video containers 91, 92 and 93 are positioned at a left side of the television or display device 38. A top video container 91 displays an interactive internet interface. This interface may contain point of sale marketing, polling, voting, interactive gaming, and the like. A middle video container 92 displays a video displaying an alternative viewpoint from what is displayed on the main program in the central video container 90. A bottom video container 93 displays a video displaying a further alternative viewpoint from what is displayed on the main program in the central video container 90. The content of the video containers 90, 91, 92, 93 may come from a variety of sources such as a cable feed, internet, satellite dish, may be pre-recorded, and the like. Further, the source of the content in the smaller video container 91, 92, 93 may be different from the source of the content in the central video container 90.

Audio

One or more of the system's heterogeneous input sources 25 of FIG. 1 may comprise audio content. The video display system 46 may be operable to automatically transmit to audio output devices associated with the television or display device 38 or display the audio associated with a video container of primary interest. The identification of a video container of interest may be derived based on one or more of the following: selection by the user of a container of interest via a menu (on screen), switching among containers on screen via remote control until preferred audio is heard, data from input devices capable of tracking the gaze of one of more users to determine what container is being watched, or a rule set, such as one that indicates among various containers default and/or customized (e.g., personalized) rules as to what audio is preferred when multiple containers are present, and the like. By way of example of a default rule set, when a container containing talk show content shares a screen with a container containing video game content, a rule could indicate that the talk show audio content will be heard unless the user takes action to select the video game audio content, as one might conclude that it is unlikely a user would watch a talk show without hearing the audio, while a user might often play a video game without sound. Similar default rules may be developed for various pairs or larger groups of containers of content, and such rules might be customized to particular situations or personalized to preferences of particular users, such as by selection of preferences in a menu or by tracking user behavior to provide audio selection based on previous selections by the user in similar situations. In embodiments, identification of the video container of interest may be based on length of gaze on a particular video container, a defined activation signal such as blinking twice, an activation mechanism set up by configuration, the size of the video container or the like. As the apparent video container of interest changes the system may switch between audio content being played. The system may decode and blend the audio content of all the video containers and selectively reduce the sound levels of audio content not associated with the video container. The blended audio may then be output to one or more of television speakers, auxiliary speakers, mobile devices, blue tooth headphones and the like. For example, in embodiments the audio for the container of interest could be sent to the main front speaker in a surround sound system, with audio for another container being played through the back speakers, optionally at lower volume.

Figure 9:
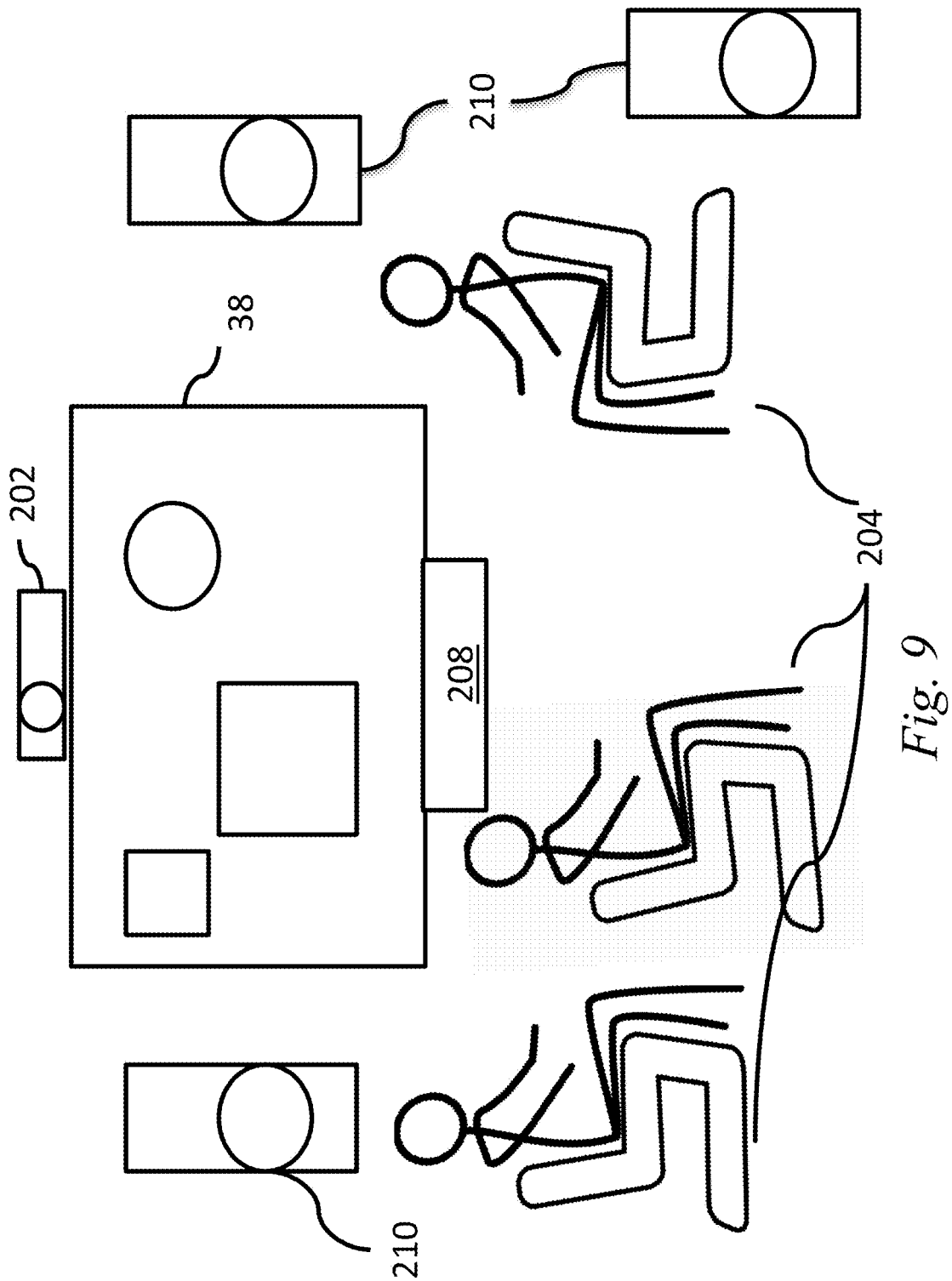
FIG. 9 is an illustration of a tracking system for tracking a video container of interest.

FIG. 9 shows a television or display device 38 with a tracking system 202. The tracking system 202 may track the eye movements of one or more viewers 204. Based on the tracked eye movements of the viewers the video display system 46 may identify one or more video containers of primary interest. The system may be in a mode where a single video container of primary interest is identified based on the interest of one or more viewers 204. In this mode a principal viewer may be identified, or the eye movements of more than one viewer evaluated according to a rule set to identify the video container of primary interest. If a single video container of interest is identified, the associated audio content may be output to one or more of television speakers 208, auxiliary speakers 210, mobile devices 212, blue tooth headphones 304 and the like.

Identification of the video container of interest may be based on length of gaze on a particular video container, a defined activation signal such as blinking twice, an activation mechanism set up by configuration, the size of the video container or the like. As the apparent video container of interest changes the system may switch the audio content being played to that associated with the current video container of interest. The system may decode and blend the audio content of all the video containers and selectively reduce the sound levels of audio content not associated with the video container. The blended audio may then be output to one or more of television speakers 208, auxiliary speakers 210, mobile devices 212, headphones 304 and the like.

In some embodiments, the system may be capable of tracking an individual video container of primary interest for each of two or more users. In some embodiments, the audio content associated with the video container of primary interest for each user may be routed to an audio output selected by the user such as one or more of television speakers 208, auxiliary speakers 210, mobile devices such as a tablet or smart phone, headphones 304 and the like. In an alternate embodiment, the audio content may be directionally output to the various users through mechanisms such as directional audio speakers, wireless head sets and the like.

Figure 10:
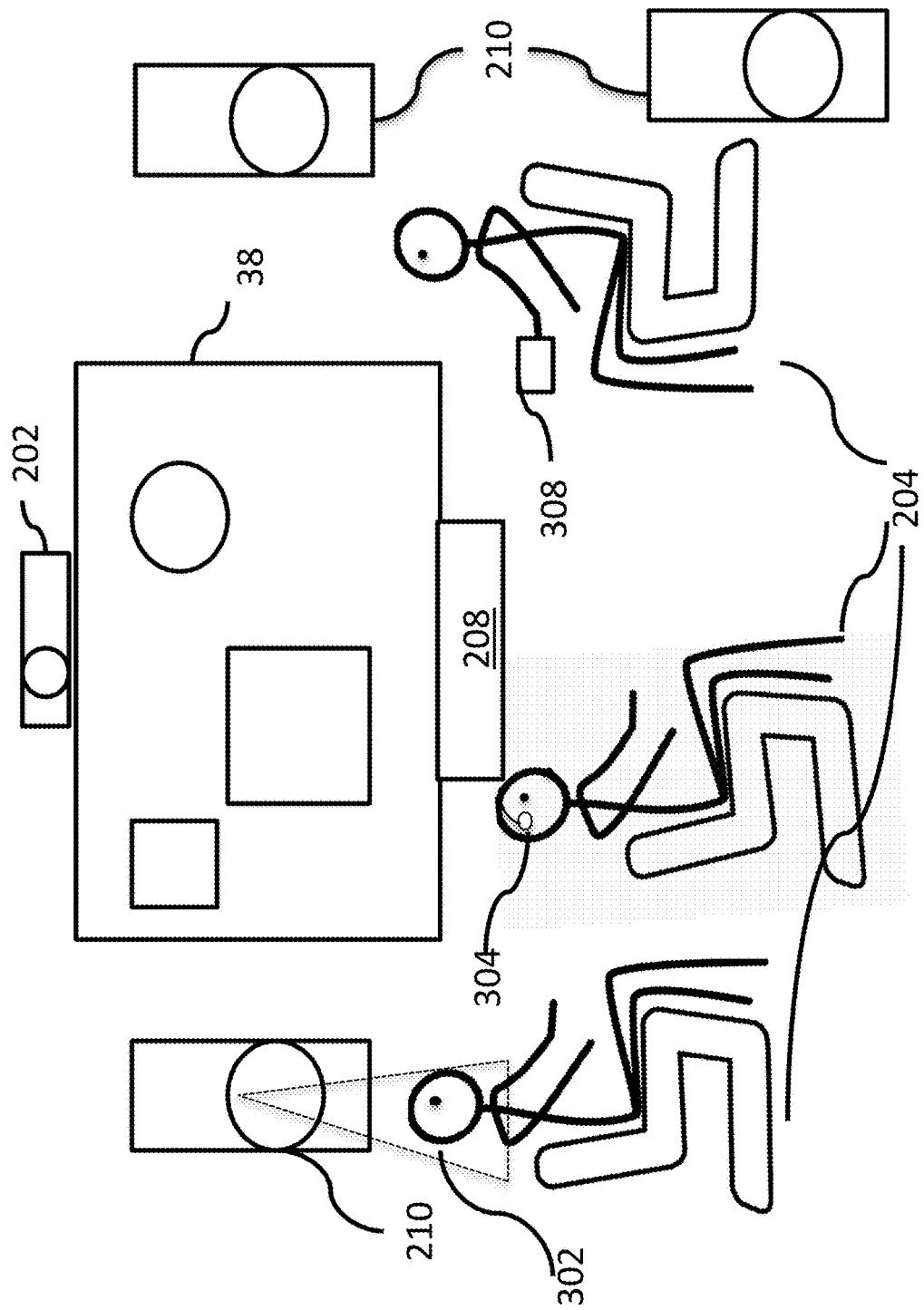
FIG. 10 is an illustration of playing audio associated with multiple video containers of interest.

FIG. 10 illustrates an embodiment where individual video containers of interest are identified for the one or more viewers 204 and respective audio associated with each video container of interest is output such that it may be heard by the associated one or more viewers. The audio may be output via an auxiliary speaker 210 creating directional audio 302, headphones 304, a mobile device 308 or the like. The headphones 304 may be connected with a wire, blue-tooth enabled or the like.

Figure 11:
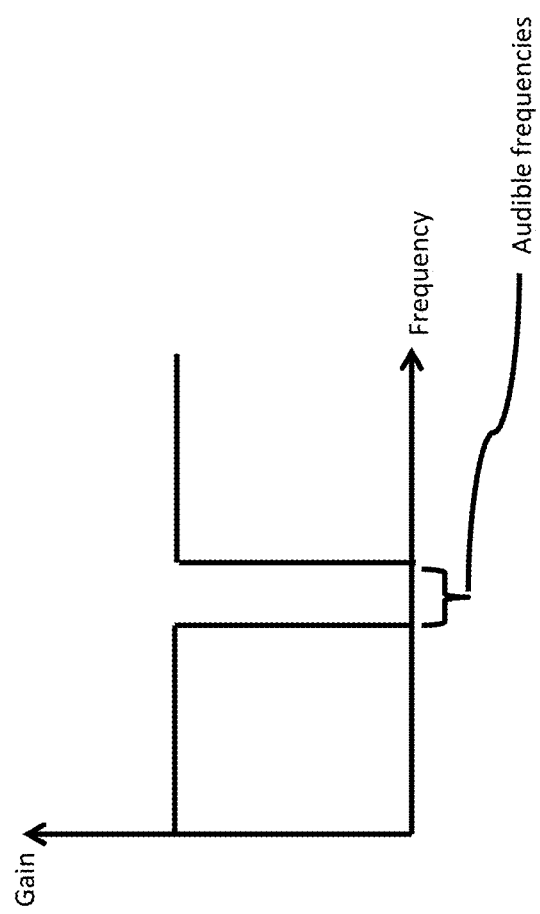
FIG. 11 shows an example of a notch filter.

Some viewer monitoring services, such as offered by Nielson, listen for audio signals embedded in content to determine what is being watched. In one embodiment, the system may decode the audio associated with all video containers being displayed and pass all decoded audio through a notch filter. FIG. 11 shows an exemplary notch filter where frequencies audible to the human ear are suppressed and frequencies not audible by human ear are preserved. The filtered signals are then summed, together with the full signal(s) associated with the one or more video containers of primary interest to the one or more viewers 204. The combined signals may then be re-encoded and sent to selected audio output devices as discussed above. An audio based tracking device may identify one or more audio signals, encoded at frequencies outside of those audible to the human ear, associated with the one or more heterogeneous source content being displayed. The one or more users hear only the audio associated with the video container of primary interest.

Widgets

Figure 12:
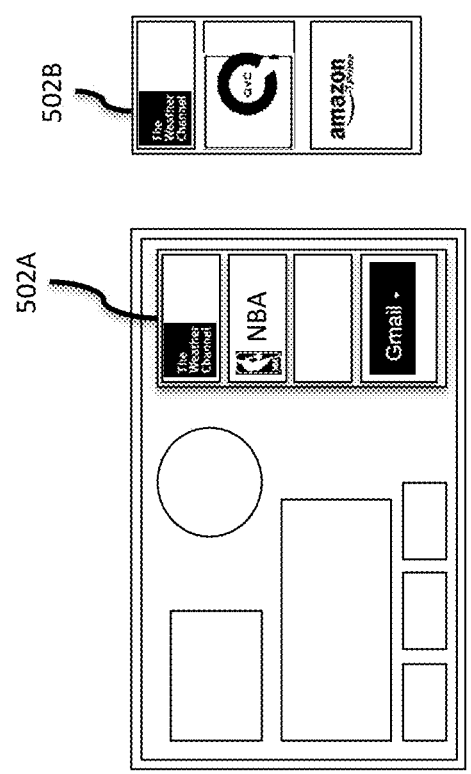
FIG. 12 illustrates an example of a display comprising video content and a group of widgets.

In one embodiment, a video container may comprise a widget where a widget is one of a website, an application running locally or remotely, a social media interface, a shopping application or the like. Two or more widgets may be grouped in such a way that the user may interact with the group of widgets as a whole. In some embodiments, there may be multiple groups of widgets. The user may be able to flip between the display of different groups of widgets. FIG. 12 shows an example of a television or display device 38 or other display with a group of widgets 502 comprising one or more widgets 504. Group of widgets 502A is currently being displayed. Group of widgets 502B represents an additional group of widgets that the viewer 204 may alternately select to display. The system would enable the viewer 204 to flip between group of widgets 502A and 502B. The widgets in a group may be personalized based on user identity, demographics, user preferences and the like. The widgets in a group may be partially preselected and grouped by the user.

The selection of widgets in a group may be partially auto-populated based on the content of other video containers. In some embodiments, the video stream may comprise metadata indicating widgets to be displayed. In other embodiments, widgets may be displayed based on a rule-set in the video display system. An example of rule-based widgets may be the display of groups of widgets based on the combination of genre being displayed and user demographic and personal information. An example of linking video content and widgets is shown in FIG. 12. In this example, the display comprises a video container having a baseball game and a group or gang of widgets. The group or gang of widgets comprising one or more of default and user specified widgets such as a weather app, a stock market ticker and the like. Additionally, because there is a baseball game being shown in a video, the group of widgets may also comprise a link to team branded merchandise for the teams playing, statistics on the particular players on screen and the like.

In some embodiments, interaction with one or more of the widgets may result in a change in other video containers. The change may comprise one or more of the addition of video containers to the display, a change in the input being displayed in one or more on-screen video containers, the closure of one or more current video containers and the like. In a non-limiting example, selection of replay in a team widget may result in an additional video container showing the identified play being added to the outgoing video stream. In another non-limiting example, a widget may include a selection of video streams such as different screen angles in a sport game and selection of a camera angle might result in the addition of a video container on the screen or a change in the camera angle being displayed in an existing on-screen video container. In one example, a sports event may be shown in one video container with smaller video containers in proximity showing alternate camera angles of the same event. Selection of a video container containing one of the alternate camera angles may result in enlargement of that video container and the reduction in size of the larger video container comprising content related to the same sporting event, swapping of content between video containers or the like.

A widget or group of widgets may be shared between users. A user may recommend various widgets or video content to others via social networking channels, email, the Skreens website and the like. The user may receive recommendations for widgets or video content based on similarities to other users where the similarities may include demographics, user preferences, viewing habits and the like.

Content of video containers displayed on the screen may be changed using one or more of: direct user initiation such as changing a channel or changing a layout; user interaction with a widget resulting in changes to a separate yet linked video container; user interaction such as changing the input or input channel of a video container which may result in a change in the group of widgets displayed, and an interrupt from the internet which may initiate the opening of a new video container or widget. An internet initiated, newly opened video container or widget may contain an alert, a favorite user program, emergency broadcast alerts and the like.

In some embodiments, widgets may be present in a cluster or gang of widgets but "hidden" from view a portion of the time and then "pop-up" asynchronously based on an internet signal, an external alert or event, content embedded in one of the heterogeneous sources, programmatically according to a rules set, or the like. In some embodiments, the widget may take action, such as appearing asynchronously, based on external events. The system may allocate resources to each video container and widget regardless of whether the video container or widget is currently viewable in the output video stream. Upon resource allocation, a hidden widget may check for triggering events to determine whether to take action. In an illustrative example, a user may select an NBA widget. Among the user selectable options for the widget, may be the option to pop up whenever one of the users preferred teams is ready for tip off. When this particular widget receives system resources it may check user preferences and game status and take appropriate action such as display a message that the game is about to start, open up a new video container at a particular location on screen, change the input of a currently viewable video container to the game and the like. In other embodiments, a widget could poll for weather alerts, incoming calls, new email, urgent text messages, reminders, device alerts such as low battery on an oxygen tank and the like.

In one embodiment a widget may check search the text of the closed caption meta-data which may be associated with video content. The text may be analyzed for trigger words, phrases, repetition of key words and the like. Closed caption text associated with the content of current video containers may be searched as well as the closed caption text associated with other channels of interest. A rule set may be comprise actions to be taken upon the identification of said trigger words and the like. Actions may comprise the pop-up of a widget, opening a new video container, changing the content of an existing video container and the like.

Some shopping widgets may have access to user profile information that may include shopping credentials. A widget specification may include an option to simplify the purchase process and enable one click shopping for identified sites.

User Interface Capabilities and Hardware

Figure 13:
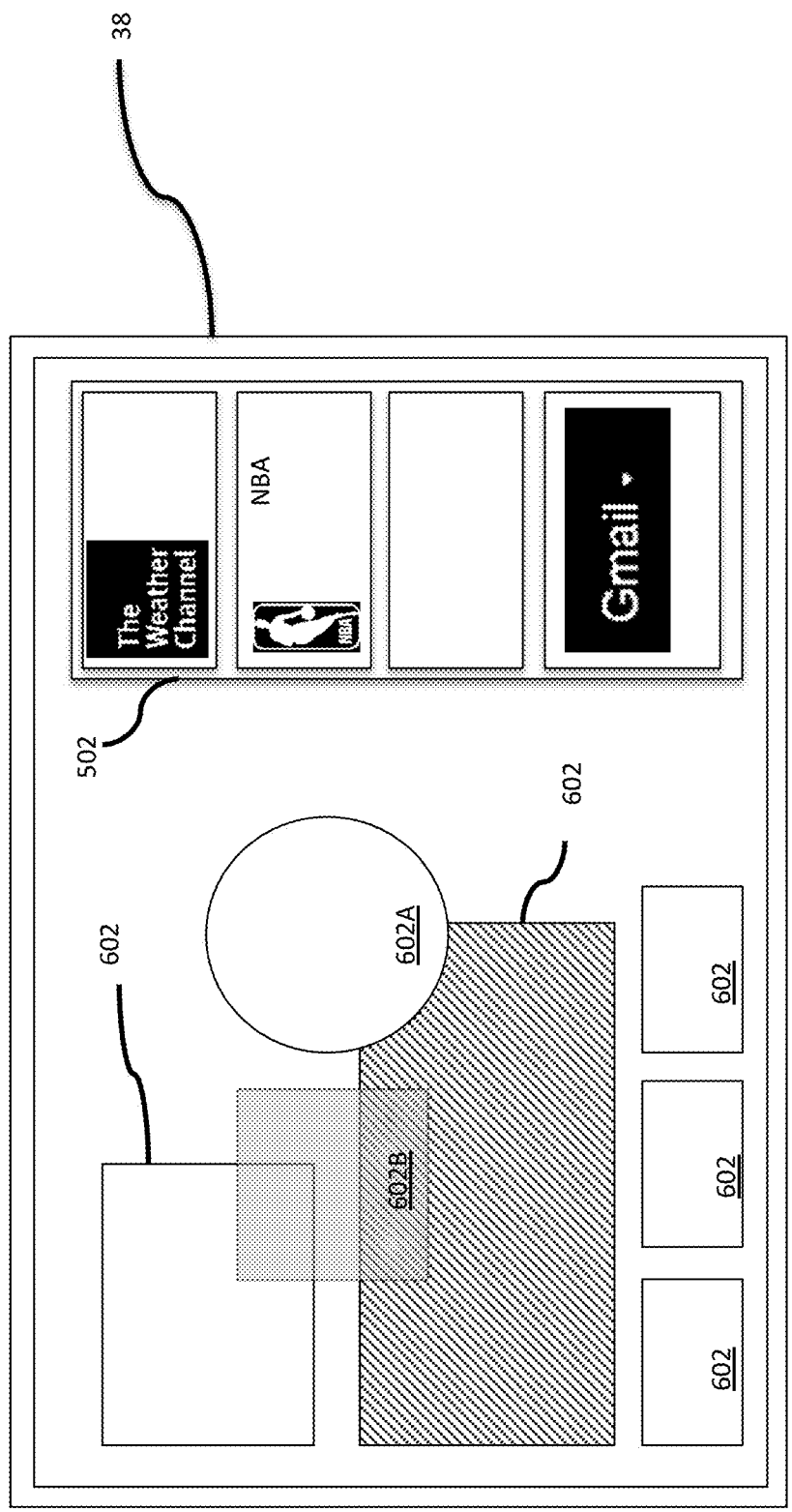
FIG. 13 shows an example of linked widgets and video containers.

The video display system of this invention is designed to provide a user with extensive control over the viewing experience including one or more of content, display layout, interactive properties and the like. A user may be provided with tools to specify and control his or her viewing experience with in-system control tools that may be displayed on the television or display device 38 or display screen, such as in a video container. The control tools may be manipulated using standard user interface mechanisms such as a mouse, track-ball, joy-stick, motion tracking system, touch screen, or the like, or via a mobile device such as a tablet or smart phone, PC, or the like. In another embodiment, the user may specify viewing one or more of video container layout, parameters, user preferences and the like on a website or by using a local or remote application. A user interface application may allow the user to select from pre-set layouts or to explicitly and arbitrarily size, position and shape each video container to be displayed. The shape of a video container may be rectangular, circular, other geometric shape, free-form shape or the like. The user interface may enable the sizing, positioning and the like of four or more video containers. The user interface may allow the user to identify which video container should be in front when two or more video containers overlay one another. Additionally, the user interface may allow the user to specify a degree of transparency associated with a plurality of video containers when two or more video containers overlay one another. FIG. 13 shows an example of a television or display device 38 or other display device on which may be seen a plurality of video containers 602. The plurality of video containers 602 comprises a circular video container 602A, an example of one video container 602A overlaying and obscuring a portion of another video container. There is also an example of a partially transparent video container 602B.

In another embodiment, the user may be able to explicitly link the content of various video containers and individual or groups of widgets. The user may be able to specify inter-container relationships, interactions and the like in such a way that an interaction with one container may result in a change in another video container, including one or more of alternate content being shown, changes in size, position, shape, transparency, and visibility, alternate options available for the video container, and the like. An illustrative and non-limiting example of this would be where user selection of a genre in one video container would change the selection of channels available in another video container.

In another embodiment, the user may be able to sync the input from two or more heterogeneous input sources and then blend the output in a single video container. Un-synced input might result in a mismatch between frames from the different sources. It may be desirable to sync the inputs such that contiguous full frames from each source are blended together rather that blending one source containing the last half of one frame and the beginning of the next with another source that is showing a complete frame.

Another embodiment comprising synchronization of two or more heterogeneous outputs may comprise blending two or more of video, animation content, game output, direct camera feeds and the like. This may allow a user to place themselves into action of the game, video and the like.

User Interface Hardware

The system may support multiple input devices including mobile devices such as tablets, smart phones and the like, remote controls, PCs, game controllers, mice, track-balls, joy-sticks, motion tracking systems, voice activation, speech recognition components, wireless keyboards, and the like.

There may be multiple heterogeneous sources being displayed in video containers and visible as part of the combined output of the system. The user may wish to interact with the individual content of the one or more video containers. The user may also wish to interact with the system's graphical user interface to control layout, video container parameters and the like. This may be achieved by using one or more user input devices, such as network computing devices 39 of FIG. 1. In some embodiments, the user may interact with content of a video container using another input device, such as one associated with the source of the video container content, and may interact with the system using an input device associated with the system. However, it may be confusing and time consuming for the user to switch between different devices.

Thus, in an embodiment of this system it may be possible for the user to utilize a single input device to control both the system parameters as well as the various heterogeneous input sources. The system may be able to toggle between interpreting received signals as inputs to the system graphical user interface (GUI) and as inputs to the input source of a currently active video container. In an illustrative and non-limiting implementation, the system may identify when a particular video container has been selected. The system input device may or may not have an explicit option to select between system GUI control and control of source input. When the system receives commands intended for an input source, the signal is translated or remapped into a corresponding signal appropriate for the intended input source and resent using one or more of a communications channel such as an HDMI command channel, an infrastructure such as an IP network, IR laser, or the like, to the input source that maps to the active video container.

In another embodiment, a third party remote control device or a control device for one of the heterogeneous input sources may be linked to the display system and act as both an input device for the system GUI and as an input device for one or more of the heterogeneous input sources. Additionally, signals from such a third party remote control device may be interpreted by the system as being for yet another input source. In an illustrative example, the joystick for an xBox game system, one of the systems heterogeneous input sources, may also act as the controller for the system graphical user interface GUI, as well as a controller for an old VHS tape system, another of the systems potential heterogeneous input sources.

In one embodiment, it may be possible to mirror the system's graphical user interface, GUI, on one or more secondary displays such as a tablet, a PC, a laptop, a mobile device, a smart phone, a second television, or the like. This may provide the user with the ability to utilize interface capabilities that may be associated with the secondary display such as a keyboard, touchscreen and the like. These additional interface capabilities may enhance the user experience and the user's ability to edit widgets, input user preferences and personal data, setup syncing of a plurality of heterogeneous sources, adjust shape, size, and transparency of video containers, enter complex statements for searching or editing text fields and the like. The mirrored GUI may be implemented by serving the same video output to more than one television or display device 38. Alternately, the same GUI and control may be achieved by a native application developed using a common API to that used for the system GUI.

Figure 14:
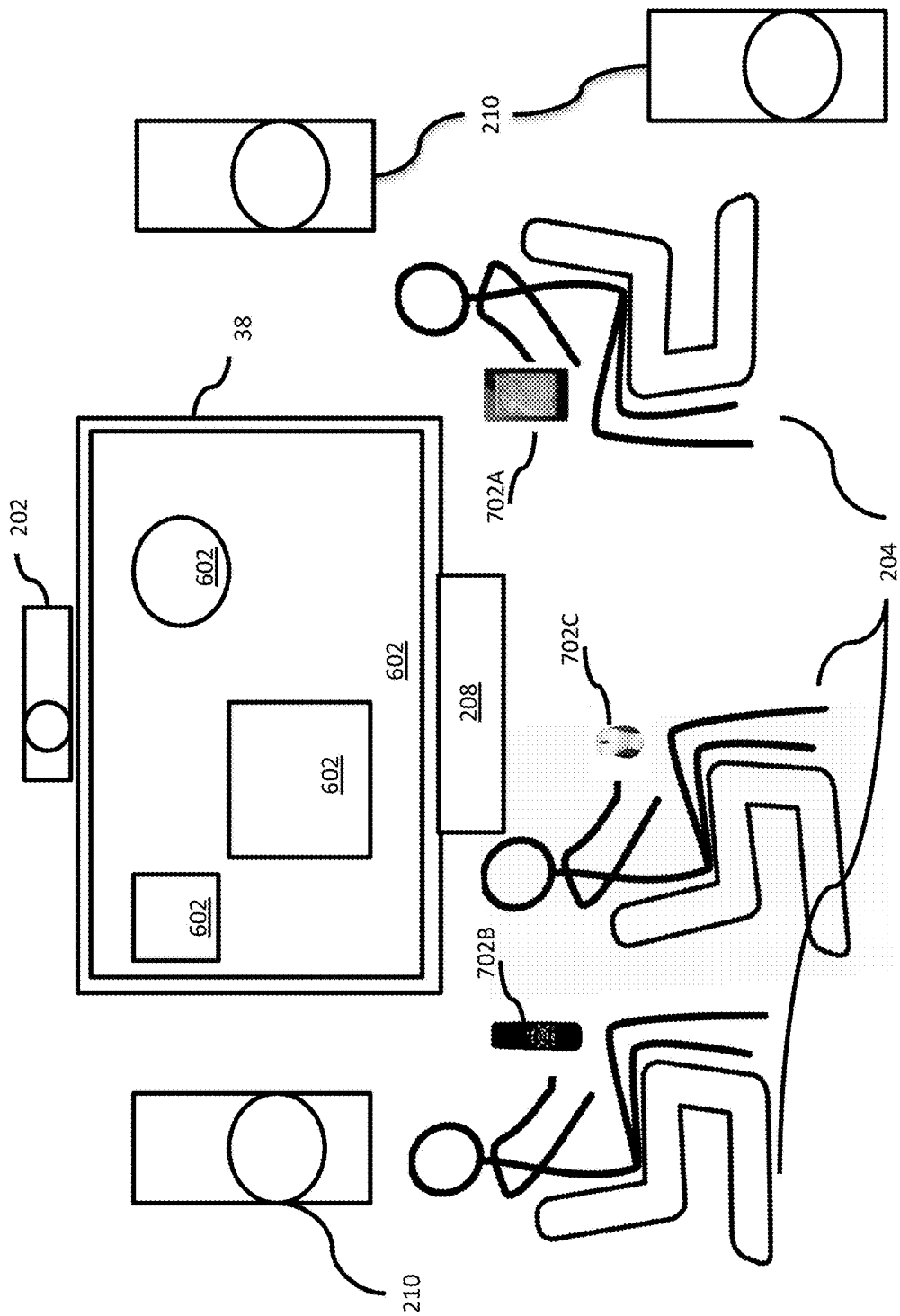
FIG. 14 shows an example of using a single remote control for both the video display system and the heterogeneous input sources.

In some embodiments, the system may support the simultaneous receipt of GUI control information from one or more input devices. FIG. 14 shows an illustrative example of this embodiment with multiple input devices simultaneously controlling a single television or display device 38 or display device. FIG. 14 shows three viewers 204 watching a single television or display device 38 or other display comprising a background video container 602 and three additional video containers 602 displaying content independent of the other video containers. Each viewer may have a separate input device 702 being one or more of a mobile device 702A such as a table or smart phone, remote control 702B, PCs, game controllers, mice 702C, track-ball, joy-stick, motion tracking system and the like. With their individual input devices 702, each viewer 204 may specify one or more of content, size, position, change in size or position, transparency, and the like of one or more of the video containers 602. The viewers 204 may "battle" each other for the control of all the video containers 602 or reach a compromise regarding control over the individual windows/video containers 602. The individual viewers 204 may each control the content, size, position, transparency, and the like of one or more unique video containers. In some embodiments, each viewer 204 may provide a unique user ID to the system, allowing the system to apply user preferences and associate user data to the video container in their control including channels, color schemes, widgets, user purchase data and the like.

In another embodiment the multiple input devices may be used by the viewers to play games against one another, the computer, other users on the internet, "televised" game shows and the like. In some embodiments, the game may be linked to game show that is televised, broadcast, digitally distributed and the like. A widget may be developed to play a particular game show such as "Price is Right", "Wheel of Fortune" or the like. The live game may comprise metadata in addition to video and audio content. The widget may be designed to sync with a live game or a previous game using show number or other identifying information. The synced widget may enable the viewers to play alongside of the televised participants.

Hardware Configurations

Figure 15:
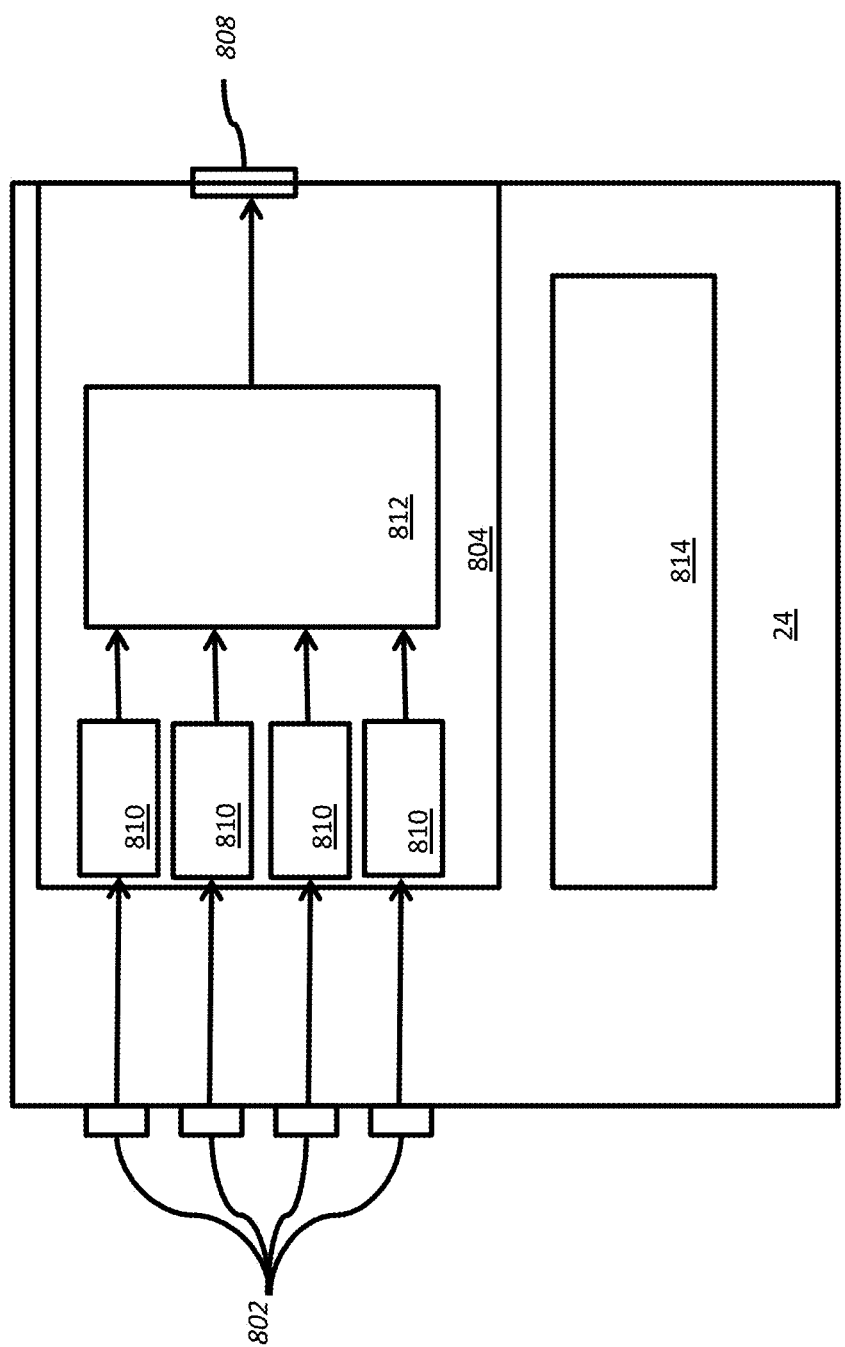
FIG. 15 shows an example of video display system with multiple input ports.

In one embodiment of a video display system, shown in FIG. 15, there is a computerized media processing system 24 comprising four or more input ports 802, an FPGA 804, custom chip, programmable logic device or the like and an output port 808. In addition, the embodiment may comprise additional electronics hardware and software elements. Each input port 802 may support receipt of data in a format such as HDMI, DVI, IP data stream comprising raw, encrypted, unencrypted, or other video data schemes such as Universal Plug and Play, UPnP, digital living network alliance, DLNA, RVU, and the like. The system may comprise input ports 802 comprising support for one of more of the above input formats. In some embodiments all the input ports 802 may be HDMI compatible. In some embodiments all the input ports 802 may be for the receipt of IP data streams. IP data streams may be received via Ethernet, coaxial cable supporting Multimedia over Coax Alliance, MOCA, 802.11, 4G or other transmission means and the like. In yet other embodiments, there may be a mix of input port 802 types. The input ports 802 may be connected in parallel to a single FPGA 804 or other programmable logical device wherein the programmable device is designed to process in parallel the multiple inputs in separately allocated processing areas 810 on the device. As the content from each input port 802 is processed in parallel, the subsequent output data streams are written to a common memory buffer 812. The common memory buffer 812 may also be located on the same FPGA 804, logical device or the like. Processing the individual inputs in parallel on the FPGA 804 and storing the processed data on the same FPGA 804 eliminates the need to move data across a computer bus and may enhance processing speed. The contents of the common memory buffer 812 are combined in conformance with parameters provided by the formatting module 814 and written to the output port 808.

Figure 16:
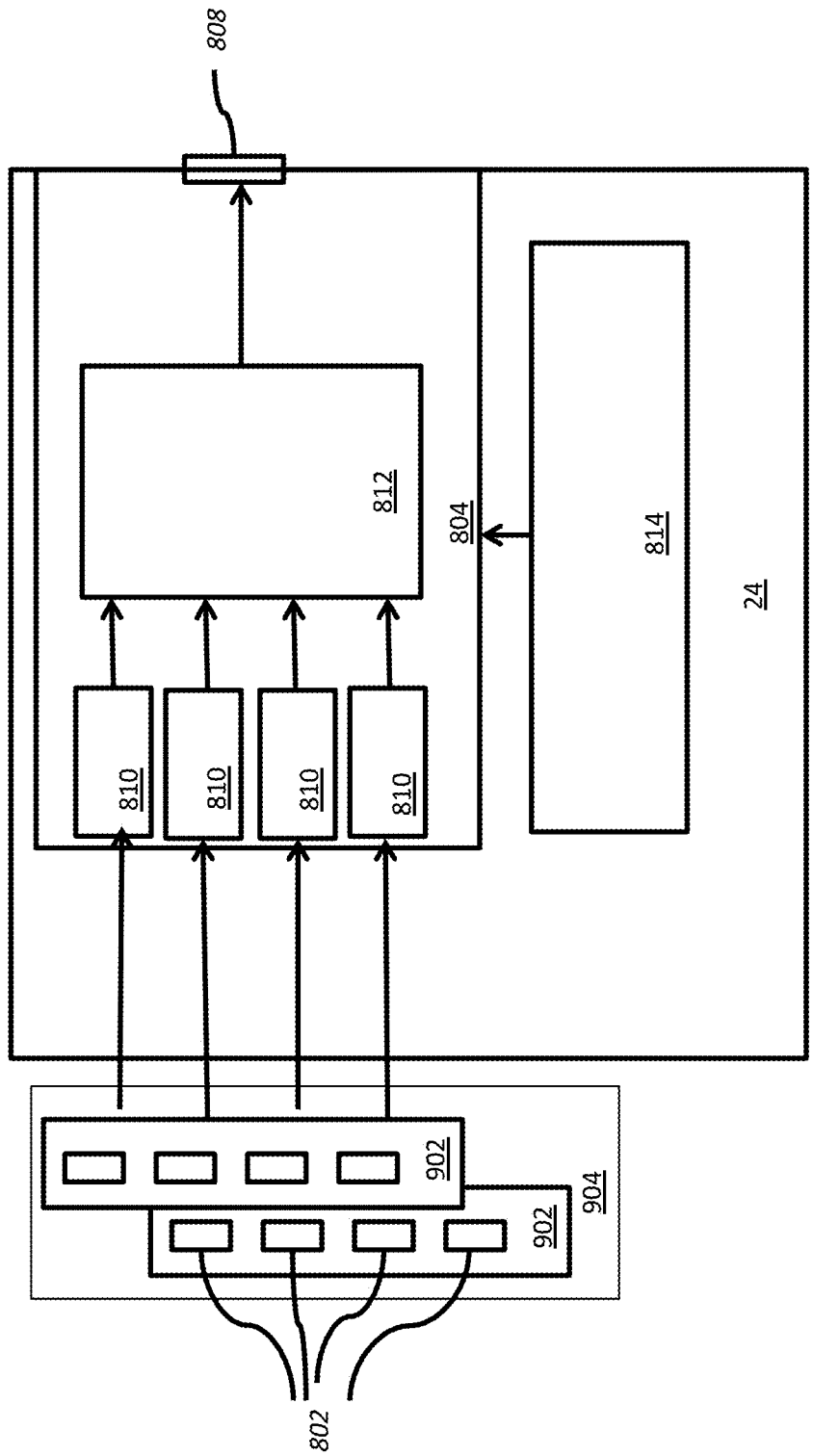
FIG. 16 shows details of the system hardware.

In another embodiment, shown in FIG. 16 the computerized media processing system 24 may have twelve or more input ports 802 and an FPGA 804. The input ports 802 may be connected in parallel to a single FPGA 804 or other programmable logic device. In yet another embodiment, there may be multiple input ports 802 configured in sets wherein the sets 902 of input ports 802 are multiplexed 904 into a single FPGA 804 or other programmable logic device. In this embodiment, at any given time, the FPGA 804 would be able to parallel process only the multiple input ports 802 associated with a given set 902 of input ports 802. In addition to multiple input ports 802, the computerized media processing system 24 may have one or more output ports 808 comprising support for one or more of HDMI, DVI, Internet Protocol, RVU, Universal Plug and Play, UPnP, and Digital Living Network Alliance, DLNA protocols and the like.

As the individual input ports 802 are processed, a portion or all of the output data stream for each input port 802 is written to a common memory buffer 812. The specifics of what portion of each data stream is written to the output buffer, the location at which the output may be written, the extent of overlay or blending of multiple heterogeneous data stream outputs and the like are performed in conformance with parameters provided by the formatting module 814 and a rule-set. The formatting module 814 may specify the display location for each input port 802 including spatial location, size of display window, shape of display window, overlap between video display containers including any overlay, transparency or blending of display windows. The FPGA 804 or processing module comprises circuitry capable of processing and combining the multiple inputs as specified by the parameters from the formatting module 814 and then sending the resultant, combined output to one or more of the output ports 808.

The FPGA 804 or other processing module may comprise a logic module for resizing and handling of overlay information among input ports 802. The system may handle multiple input ports 802 and comprise a synchronization module or process for handling or avoiding bit-by-bit competition on overlapping output regions of a display device. In one embodiment the formatting module 814 may provide a bounding box of pixel locations for display to the output port 808 of an FPGA 804 or other logical device.

While the system for implementing this video display method has been described in terms of certain hardware configurations these should not be considered limiting. It should be understood that the functionality of decoding and processing multiple input streams simultaneously and displaying the processed content in a set of video containers having arbitrary parameters for size, shape and the like may be accomplished in a variety of ways. The decoding and processing may be done locally using one of a variety of schemes such as a computer and software wherein the computer has sufficient processing power to process the multiple inputs in parallel, a combination of customized hardware and software, a custom FPGA or a some combination thereof. Portions of decoding and processing may take place in the cloud with the final combined output being streamed to the local display device. In one embodiment portions of the decoding and processing may be distributed across various components of the larger system with some portions being done by a set top box, the television, or the like.

In some embodiments, it may be possible to upgrade the firmware of the FPGA, or other programmable logic device. This may be done remotely using a communications network, locally using a DVD or other portable computer readable medium, and the like to upload a new image or data to the FPGA.

In some embodiments, the upgrade of the FPGA may facilitate a rotating hardware key system enabling user or system authentication prior to allowing licensed content to be displayed in one or more video containers. The use of a cloud or a website to maintain user profiles and information may enable the registration of the unit in combination with a user authentication widget. The video display system could then authenticate and enable the playback of digital rights management, DRM, protected media without the need to access individual websites for authentication.

In some embodiments, the FPGA or other programmable logic device may be programmable in situ. This may allow updates to the rule sets for one or more of blending, overlay logic and the like, security features, new transport protocols for IP, HDMI or other transport systems for new ways to connect inputs to the system and the like.

In one embodiment, the video output of the system may be higher picture resolutions, such as 4K. The system may generate this larger output stream by combing multiple lower resolution video streams (such as 1080, 720, and the like), upconverting to a single 4K or other higher resolution video stream and the like.

Video data is frequently transmitted in a compressed format such as MPEG2, MPEG4 encoded video and audio and the like. The compression facilitates transportation of large amounts of data across limited bandwidth channels, for example video over cable to a home. However, once the compressed format data is received, processing is required to retrieve the uncompressed video and audio data. Additionally, processing may be needed to decrypt additional encoding such as security, digital rights management, DRM, and the like. Once the data has been thus processed it may be configured for output compliant with one or more of the following protocols; HDMI, DVI, Internet Protocol, RVU, Universal Plug and Play, UPnP, and Digital Living Network Alliance, DLNA protocols and the like. This data manipulation may require significant processing capacity. Typical consumer video display equipment may only be equipped to process a single high resolution or possibly two low definition data streams simultaneously.

Due to the limited capacity of typical existing consumer display equipment it may be desirable to provide additional processing power to facilitate the simultaneous processing of multiple compressed and or encrypted data streams. In one embodiment, this may be done by leveraging the HDMI control lines in conjunction with one or more external processors such as HDMI stick PCs, PC, other Set Top Boxes and the like. Using the HDMI control lines these external processors may be used as secondary devices to decode and decompress video and then output using the standard HDMI output lines.

In an illustrative and non-limiting example, the compressed video may be received by a primary set top box, STB, via cable, satellite, internet infrastructure or the like. The format of this compressed video may be MPEG2 Transport Stream, a standard broadcast video standard, MPEG4, or the like. The primary STB may have more than one tuner to select a desired program and receive the compressed data containing the audio and video of the desired program in an MPEG2 Transport Stream, MPEG4 data stream or the like. The compressed data may be sent by the STB over an out-of-band local internet connection, control channel in the HDMI protocol, or other transport mechanism, to the video display system of this invention. The compressed data may then be sent to one or more of the secondary processing devices for decompression and decoding. The decompressed and decoded video and audio content may then be output using the HDMI interface.

In a variation on this embodiment, the use of external processing capacity such as HDMI stick PCs, PCs, and other set top boxes may be replaced by additional processing capacity on the FPGA. The FPGA or other programmable logic device, logic chip or the like may comprise one or more decoders for decompressing MPEG2 Transport Stream, MPEG4 and the like. The results of the decompression may then be transferred to one of the input port processing areas on the FPGA for integration into the output video stream.

In another variation of this embodiment, the FPGA, or other programmable logic device, logic chip or the like may be incorporated into the primary set top box, STB. In this embodiment, multiple tuners may be connected by electronic bus (PCIe, parallel, etc.) to the FPGA. Thus, decompression is done in the set top box, STB, and the decompressed and/or decrypted video and audio content is then transmitted to the video display system.

In one embodiment, the system may transfer data between ports such as HDMI ports, IP Ethernet ports, and the like. In this manner, the system may send packet data between any program or device connected to the system such as being able to send data live from an internet widget to an xBox to be processed live and the like. The ability to transfer data directly between programs may reduce complexity including reducing the need for extra wires, eliminating some remote controls, and the like.

In an illustrative and non-limiting example, statistics from a live basketball game may be transferred via the video display system to an xBox attached to the system. The xBox may play a basketball video game according to the statistics of the live game as received from the video display system. This may enable a user to see, via an xBox basketball game, a graphics rendition of real basketball game events where the game is played according to the live statistics passed by a basketball widget.

In an embodiment, one or more of the heterogeneous sources may comprise a "second screen" application enabling the system to display applications and content intended for display on a smart phone, table or other mobile device for display in a video container. In another embodiment, the system may mirror the display of a tablet, smart phone, or mobile device in a video container displayed as part of the combined system output.

User Interfaces

In one example, one of the HDMI inputs to the media processing unit may comprise a graphical user interface (GUI). This GUI may be displayed in a background video container over which additional video containers may be displayed. This GUI may be one of an HTML5 application (with HTML5 code) running in web browser, a native application running on the video display device or the like. A user of the video display device or system may interact with this user interface through a variety of input devices including one or more of mobile devices such as smartphones, tablets and the like, PCs, remote controls, wireless mouse/keyboard devices and the like. A user of the video display device or system may select a user profile via the GUI causing the user interface to interact with another application, website or the like to access one or more of user preferences, user associated widgets, personal user data including usernames, passwords, and purchase information, user preferred layout and channels and the like. Additionally, the identification of a unique user may allow the system, either the video system or a remote application, website or the like, to gather and store analytics on the particular user, their viewing habits, nature of one or more of input channels being displayed, location, size, shape, transparency and the like of each video container on the screen, which widgets are displayed, the number of widgets and the nature and extent of widget interactions, video game activity including game identity, length of play, and the like, time and date information, which channel had corresponding sound being played, relationships between shows, widgets and the like displayed together, co-viewing of different material and the like. The identification of a unique user may enable the system to limit the display of certain content, widget access, data collection and the like based on age of user. The user interface may communicate with the formatting module to provide parameters relating to the layout and appearance of the output display.

The user interface may be accessed simultaneously by one or more input methods such as at the video display device, using a local application or a remote application running on a PC, mobile device or the like, or accessing a website via a web browser on a device and a communication network, or the like. In embodiments, a user interface accessed and displayed in such a manner enables the creation of a profile of a unique user including allowing the user to specify information about their personal demographics such as name, gender, payment information such as credit card, PayPal™ account information and the like. Additionally, the user may specify preferred genres, favorite teams, newsstations, areas of interest, default screen layout including number, size, position and default content of video containers, widget preferences and the like. In some embodiments, access to the different levels of customization may be available based on user enrollment in different business models. In another embodiment, the user interface may gather information about the particular hardware, system and software configuration of the user's video display device.

Figure 17:
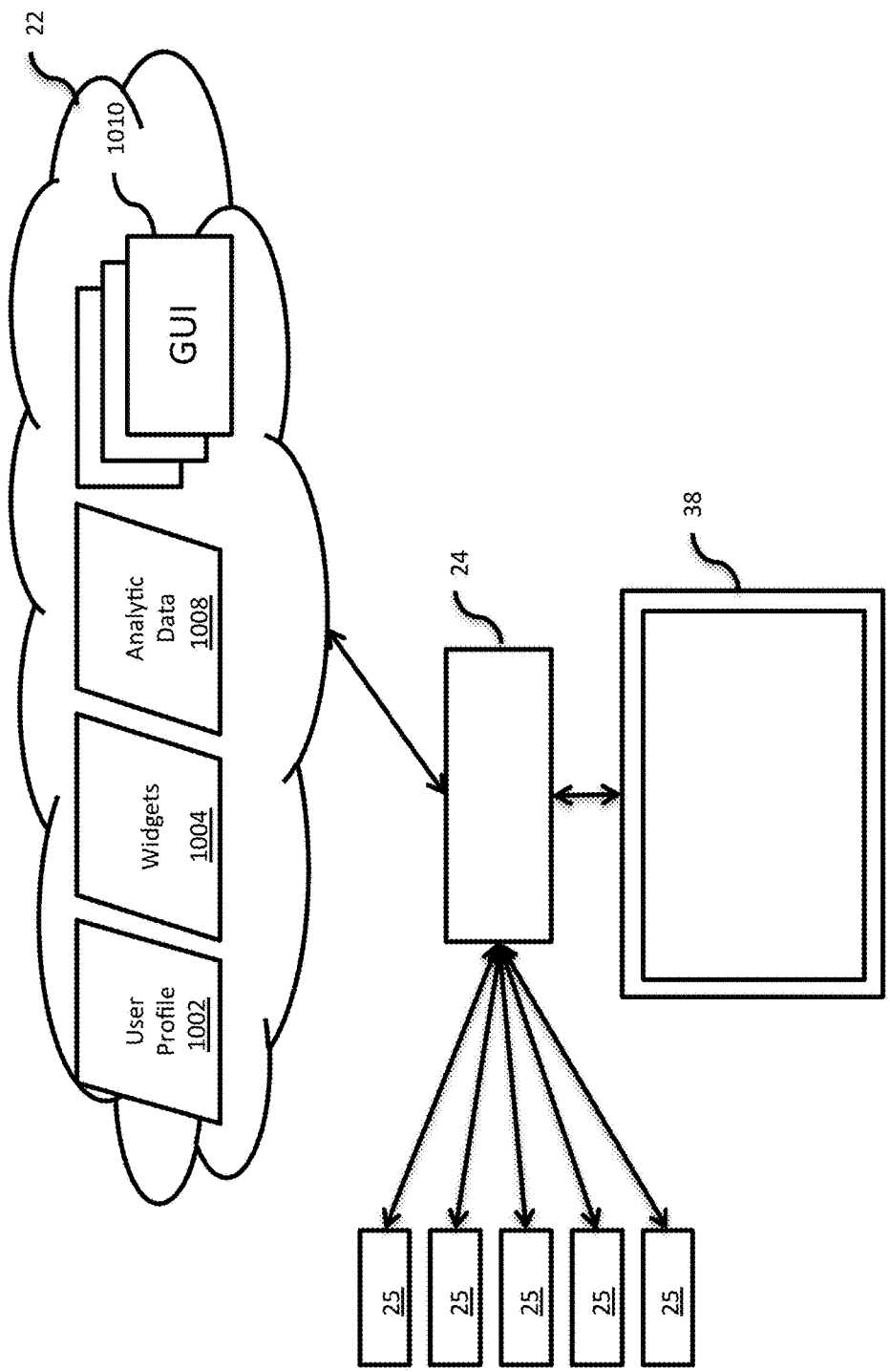
FIG. 17 illustrates the use of a user profile.

FIG. 17 shows an embodiment, where user profile is selected, the video display system may access a website or server via a communications network 22 which would provide the particular video display system with one or more of the user's personal preferences 1002 including default display layout, channels, widget selections and the like. The same or another website may act as a widget server 1004 providing the latest widgets to the video display system. Analytic data 1008 may also be stored in the cloud 1702.

In one embodiment, the HDMI input may comprise video content in which meta-data has been embedded into the video stream. The embedded meta-data may comprise information about the scene content of the video stream, links to related internet sites, links to related social networking sites and channels, sales channels, executable scripts and the like. In one example, the video content may be a televised game and the embedded meta-data may include information about the team, information on the individual players, links to the team's website and the like. In another example, the video content may comprise a news show and the embedded meta-data may include links to additional information on the topic being discussed, information on the newscasters, secondary stories and the like. In a further example, the video content may comprise a home-shopping channel and the embedded meta-data may contain links to information about the individual items for sale, information on designers, information on related accessories and the like.

In one embodiment, the video display system extracts embedded meta-data from the video content of the plurality of input sources and acts on the meta-data according to a rule set. In one embodiment, the inclusion of meta-data may result in information scrolling across the bottom of the video container in which that video is displayed. In another embodiment, the meta-data and rules may result in a widget being displayed. In another embodiment, the meta-data and rule-set may result in a twitter feed related to the video content being displayed on the larger screen. These examples are meant to be illustrative and not exhaustive.

Data Gathering

The system may track information about the viewing habits of users. The data gathered may be used to enable e-commerce, target advertising, collect analytics on device usage, and the like. In some business models, background, content and service providers may base advertising charges based on how many people are watching a program as measured by Nielson or a similar service provider. In one embodiment, meta-data, tags and the like embedded in the input content may be subsequently embedded in the output stream where it may be measured by a tracking device. In another variant, meta-data, tags or the like may be stored under the direction of the media processing unit. Storage may be local to the video display unit or to a remote website or server via the communications network. This meta-data may be combined with information including the nature of one or more of input channels being displayed, location, size, shape, transparency and the like of each video container on the screen, which input channel had corresponding audio being played, which widgets are displayed, the number of widgets and the nature and extent of widget interactions, video game activity including game identity, length of play, and the like, time and date information, which channel had corresponding sound being played, relationships between shows, widgets and the like displayed together, time and date information and the like.

In one embodiment, the system may monitor the quality of the network quality, transport stream, corresponding content integrity, image quality and the like. Network monitoring may comprise a widget that measures bandwidth and quality of the network. The network widget may be initiated by one or more of a user, a remote technician, an automatic scan system or the like. The widget may cause special tracer IP packets with time stamps to be sent with the source content to measure turnaround back to the content delivery network, CDN, to measure throughput, latency and the like. The transport stream sent over the network may be one or more of MPEG2, MPEG4 encoded video and audio, and the like. A monitoring widget may collect statistics, images and the like and perform tests for speed, noise, quality and the like, and perform analysis of test results over time, time of day, and the like. These statistics may be sent to a central website or server over the communications network where collective analysis for errors in transport or content over regions of service may be performed.

Applications

In one embodiment, the system may be used for gaming. This embodiment comprises internet widgets that accept bets over the internet or other communication networks and one or more video containers displaying live video content. Currently, users may use a PC, tablet, smart phone or the like to visit one or more gaming web sites which enable users to see options for placing bets, create an account, fund an account and place bets. These gaming web site may constantly update the odds, payout and closed bets. These gaming web sites may have corresponding widgets enabling bets to be seen and placed on the video display system of this invention. These widgets may enable asynchronous popups displaying information such as hot bets options, time running down for a game or race to place a bet, results as they occur, and the like. System stored user preferences and purchase data may allow for automatic login to the gaming widgets and corresponding gaming web sites.

In another variation, metadata about one or more sports events, races, game show, political race or other competitions and the like being shown in one or more video containers may be sent to a gaming widget. The gaming widget may use information about the current sports event, race, or the like, information about upcoming events on a particular input channel, similar competitive events such as games, races and the like to identify and show relevant bet options such as options for the current competition, future games or races, multiple simulcast races, multiple games shows with those multiple bet options shown, related competitive events and the like. The gaming widget with these options may be displayed as a popup if it is not already visible on the screen. Once a bet has been placed, information regarding the bet may be displayed in proximity to a video container showing the event. Active and available bets may be listed and selectable in the widget. Selection of specific bet or option may result in the relevant event, if available, being displayed in a new or existing video container.

The system may display one or more live games, races, competitive events and the like, make grids of relevant content, and allow a user to resize content of interest. Alternatively, the system may auto size video containers based on the size or importance of bet relating to the one or more live games, races, and competitions being displayed in the various video containers. The system may visually identify the video containers displaying content where the viewer may have a winning or losing bet. Visual indicators may include a red ring around games viewer is losing and green around ones winning versus the bets made or similar visual indicators.

In one embodiment, the system may utilize one input source to take "snapshots" of each game across multiple channels. The system may tune in to each game of interest and take a picture or short video of each and then display the "snapshots" in a gaming widget. The widget may rotate through the series of "snapshots" enabling the user to watch and get a sense of the various games. The user may then select a "snapshot" to see the game of interest in a larger format resulting in the display of the selected game in one or more of an existing video container, a pop up second video container or the like.

The system may send user statistics, game statistics in combination with information on the content of visible video containers to a gaming widget to facilitate mid game betting. In an illustrative example, a video container displaying a basketball game that is in second quarter and an NBA widget with live statistics on the basketball game are both visible on the display. If one team is losing by 20 points the system may send information from the NBA widget such as the game score, inning, current outs and the like together with the game being watched to the gaming widget. The gaming widget may then pop up a mid-game bet giving +25 to the losing team. Viewer may then place bet. Additionally, statistics on individual players may be sent facilitating individual proposition bets such as how many steals a player will have, how many rebounds, and the like.

In one embodiment local input and output devices such as cameras, joysticks, tactile stimulators and sensors and the like may be driven by widgets and linked to content in other video containers such as video content, games and social interaction sites. These embodiments could be used for applications and content where tactile input and feedback enhances the content such as learning musical instruments, physical therapy, adult content and the like.

In one embodiment, the system displays marketing or advertising material based on the content of displayed video containers. The system may open up a new video container to display the advertising material. The system may overlay a video container with a partially transparent video container whose content comprises related advertising material. The advertising material may comprise one or more of advertisements, videos, order forms, surveys, games, promotional websites, linked social websites, and the like.

In one embodiment, the system may comprise an improved TTY system for the deaf. Currently one means of distance communication for the deaf comprises a TTY system where the user may place a "call" and the communication is accomplished via text being entered by the user and responses seen on the users display. This embodiment comprises two or more video containers wherein one would show the text similar to a current TTY system. However, an additional video container might show an image of the users. This would enhance communication since a significant amount of information is communicated non-verbally.

In another embodiment, the system may comprise an improved closed caption system. Currently video content may include metadata with the text of the audio content. In current systems opting to display the closed caption content may result in the text of the audio being displayed on the bottom of the screen. The text may obscure a portion of the video content and be difficult to read due to size, lack of contrast and the like. In this embodiment the selection to display the closed caption information for a video source may result in a new video container being displayed showing the closed caption text. The position and size of this video container may be manipulated by the user for ease of viewing. It may be possible to scroll back through the content of the closed caption text.

In another embodiment the system may comprise a home command control center where the interface comprises a number of widgets and video containers. These widgets may enable one or more of asynchronous pop ups for events such as door openings, sump pump status, motion detected, idle time on devices and the like, control options to manipulate devices, display output from home video cameras while watching other video containers and the like. Control options available in such a widget may include turning a device on or off, locking windows and doors remotely, turning on one or more alarms or sirens, sending a text message or audio or video phone call, teleconference or the like, either automatically or with user input, to a person of interest such as the police, physician, a relative, security company or the like.

In one embodiment, an HDMI stick personal computer, personal computer program with wireless HDMI, or widget from web server may function as a home control system monitoring one or more of security, home appliance status, and the like. In an illustrative example, a computer or web service may receive data indicative of motion from an external home security camera. This information may be sent to the video display system and displayed as pop-up widget with a text message, video clip or the like.

In one example the system may be programmed to power connected input devices on or off via HDMI or IP command based on one or more of current display status, idle time, user parameters and the like.

In one example the system may be programmed to cycle through a series of camera systems, web sites with cameras, baby monitors, door monitors and the like. These camera views may be displayed in a background video container while other video containers are displayed in the foreground. Audio may also be programmed to pop open a widget based on programmatic rules or external events. An illustrative example of audio may be switching to audio from an infant's room on a periodic basis or when a noise is detected in the room.

In another embodiment, the user may scroll through images and videos from a tablet, smart phone, camera or the like connected to the system. The images may be shown in one video container while other video content and widgets are displayed elsewhere on the screen. The system may be enabled to auto scroll through the images on the device without user intervention if desired.

In an embodiment, the system may comprise a system and method for one or more of enhanced social commentary, social interaction and the like related to one or more of broadcast events, sports events, remotely interactive video games, online gaming and the like. In this embodiment, the system may obtain information about the content of a video container through one or more of meta-data embedded in the video and extracted by the system, information associated with channel selection and time available in a database or online, or the like. Information about the content of displayed video containers, together with one or more of user preferences, options, and analytics may cause a widget to open. The widget may display a social web site or channel related to the video content being displayed. The widget may be opened on the main display device or on a secondary display device. The ability to interact with others who are watching the same video content may create more excitement about the show through user interactions and shared experiences in cyberspace. Twitter hash tags may be automatically entered, extended and removed by other video container activity, including channel changes, new programs, history of surfing widgets, closed caption word or phrase or groups of words and the like.

In an illustrative example, users watching a reality TV show such as American Idol, Iron Chef or the like, may chat together about the relative merits of the contestants, contestant appearance, opinions regarding the contest and the judges and the like. The social site or channel may collect these interactive comments, poll participating users for questions to be displayed on the show, filter people into smaller topic groups for augmentation of the show, and the like. It may be desirable to utilize this information from users together with analytics of viewer behavior and provide advertising specifically targeted to these engaged viewers.

In another illustrative example, social commentary such as tweets and the like could be incorporated into a video game as bubbles over a users character, across the bottom of the screen or in a separate video container. A game server could provide data regarding the relative placement for messages and the system could translate this information to accommodate the actual size and location of the video container displaying the game content.

In one embodiment the system may comprise Voice over IP, VOIP, on the television. The system may allow voice calls to connect and play on the display and through the associated audio output devices while watching multiple shows. The system may mute the sound of the TV in the audio that is transmitted back to the caller but combine the sound from the caller together with the previously selected audio output being sent to the one or more audio devices. In one example, the user may be playing an online video game with remote friends and conversing with them via VOIP simultaneously.

In another embodiment, the system may integrate the functionality of one or more smart phones. This embodiment may include one or more video containers enabled to display a smart phone user interface. This interface would enable a user of the video display system to engage in smart phone activities and applications such as texting, FaceTime™, Skype™ and the like via display of the smart phone user interface. The system may also allow multiple video and voice calls simultaneously to multiple video and widget activity on the screen.

In one embodiment, the system may accept input designed to be blended to produce a stereo or 3D effect. This content may include meta-data describing the stereo effect to be achieved, which view, left or right, is represented and the like. The system may then cause the two or more content streams to be synced, blended and presented to the user. In some cases the output device may be a 3D television, stereo glasses of the like. In some cases the system may represent the views in red and green separations for use with colored glasses.

In an embodiment, the system may act as a virtual living room or virtual bar, or the like. A widget running in full screen mode and logged into a 3D virtual room may position a character or avatar on the screen to represent one more of the user and others who may be logged in to a common social site or the like. The users may manipulate the avatars in such a way that they walk around the virtual rooms. A voice over IP connection may allow users to communicate verbally with each other. In another embodiment, the system may blend live video over the 3D room where the live video may be manipulated for one or more of size, proportion and angle to approximate the virtual environment. In one implementation position coordinates such as x,y, and angle may be provided by the virtual environment widget. The system may then display the video at the location and in the orientation indicated in such a way that the user may see real video blended into a virtual environment. In an example, the system may be emulating a virtual sports bar. The system would insert the video of the game at the appropriate position with the virtual sports bar. A group of friends participating in this virtual sports bar may be each be represented by an avatar and interact with one another. The virtual reality widget could provide parameters that would enable the system to keep the video content of the different systems synced so that all users are seeing the content simultaneously.

In one embodiment the system may comprise a video conference system. The video conference system may display a plurality of video containers whose input comprises one or more of live broadcast video, video and audio input from two or more sites, mirrored computer screens and the like. In some embodiments the live broadcast video may synchronized between the different sites in such a way that all participants are viewing the same content simultaneously.

In one embodiment the system may comprise a financial desk such as that used by financial traders and the like. This embodiment would comprise multiple video containers whose input comprises one or more of live broadcast video such as financial news, current stock prices and one or mirrored computer screens and the like. The ability to display multiple live video feeds and the computer desktop on the same screen may facilitate the ability of the user to process information without having to switch from screen to screen for different information. Using the video display system of this invention allows the screen to display both the broadcast video and the computer desktop without unduly slowing down the computer.

In one application of this system the video display system may be placed in medical care environments such as hospitals, doctors offices, urgent care centers, rehabilitation centers, nursing homes, home health care environments and the like. In addition to the heterogeneous input sources described above, the input of the one or more video containers may comprise one or more of output from various medical devices including device status, physiological measurements such as blood pressure, heart rate and the like, relevant instructional content for devices, patient condition and the like. A video container may comprise an audio, or audio-video call with a health care provider where the call may be initiated by one or the patient or other user or based on a rule set, data received from external devices and the like. Device status messages may comprise informational messages such as low battery, low fluid or oxygen messages and the like.

In one embodiment the system may comprise one or more remote control widgets. A remote control widget may provide functionality associated with a remote control associated with one of the input sources. In some embodiments the remote control widget would have the look and feel of a remote control associated with a specific input source. A remote control widget may comprise functionality for remote controls associated with multiple input source devices. There may be distinct remote control widgets for each remote control associated with an input source. Upon selection of a video container, a remote control widget may "pop-up" displaying one or more of appropriate remote control functionality such as channel controls, sound controls, menus and the like, remote control appearance and the like. A remote control widget may be implemented using HTML code, JavaScript, JSON, and the like to send control signals to the intended source input. The controls may be sent using one or more of the following methods: by the widget directly through the input port connected to the input source device, via an IP command over the communications network or by sending a request to a cloud based server or website which may initiate a web call to the intended input source.

Figure 18:
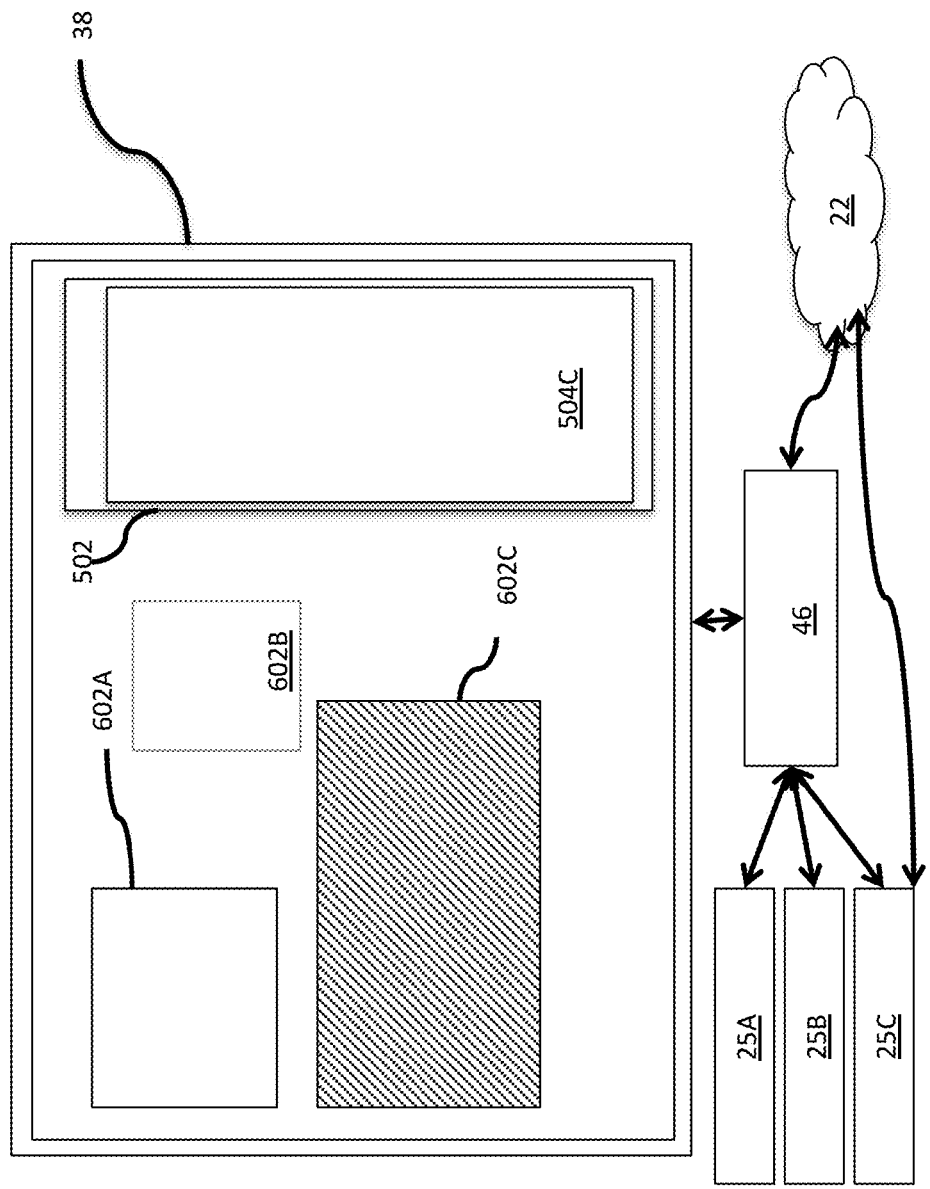
FIG. 18 shows an embodiment of the remote control widget.

FIG. 18 shows an embodiment of the remote control widget. The television or display device 38 or other display comprises three video containers 602A 602B and 602C with content from different heterogeneous input sources 25A 25B and 25C respectively. Currently video container 602C is the primary video container and the remote control display widget 504C is displayed. Some of the input ports may support 2-way communication protocols such as HDMI, IP and the like. The video display system 46 may send control commands to these heterogeneous input sources 25 using these connections. In some instances the video display system 46 may send the input controls to a 3rd party server or web site using the communications network 22.

In some instances the remote control widget 504 may be displayed on a secondary input devices such as a mobile device such as a tablet or smart phone rather than on the television or display device 38 or other display.

In this disclosure, the term "video content" is used consistently with its use by those skilled in the entertainment technology to refer to video and optional audio programming regardless of transport, encryption or other mechanisms that relate to how the video content is distributed or protected. For example, a movie is video content such as a news broadcast, internet video clip, video conferencing, or video from a security camera. Moreover, the terms "video" and "video content" are defined broadly to additionally apply to internet browsing such as web page viewing and other internet applications, email viewing, closed circuit video, security camera video, and other displayable and/or interactive content. The term "computer" is meant to encompass a workstation, personal computer, personal digital assistant (PDA), wireless telephone, or any other suitable computing device. Terms such as "component(s)," "device(s)" and the like are intended to refer to computer related entity, either hardware, a combination of hardware and software, software or software execution. For example, a component may be, but is not limited to being, a process running on a processor, a processor, an object, a reconfigurable hardware object, an executable, a thread of execution, a program and a computer. By way of illustration, both an application running on a server and the server (or control related devices) may be components. One or more components may reside within a process and/or thread of execution and a component may be localized on one computer and/or distributed between two or more computers or control devices.

The term "near real-time" refers to sensing, detecting, capturing and/or responding to external events nearly simultaneously (e.g. within microseconds or a few seconds) with their occurrence, or sufficiently fast to meet the expectations of the viewer, such as change a channel and view the new channel video content.

Systems and methods embodying the present invention may be programmed in any suitable language and technology, such as Hypertext Markup Language (HTML), Active ServerPages (ASP) and Javascript. Alternative versions maybe developed using other programming languages including but not limited to; C++, Visual Basic, Java, VHDL, other reconfigurable hardware computer languages, VBScript, Jscript, BCMAscript, XML and/or CGI. Any suitable database technology may be employed, such as: Microsoft Access, Oracle Databases and the like.

While only a few embodiments of the present invention have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

All documents referenced herein are hereby incorporated by reference.

What is claimed is:

1. A video display system comprising:
   a computerized media processing unit configured to receive video content from each of a plurality of different source devices, the media processing unit configured to aggregate and blend different video content from the different source devices to generate as output a blended video signal in an HDMI format which is receivable by a television;
   wherein one of the plurality of source devices is a network computing device configured to run a web-based application that provides access to internet video content to the media processing unit, provides a graphical user interface for the video display system, and provides control instructions to the media processing unit;
   wherein the video signal output by the media processing unit comprises a plurality of video containers all displayable on the television simultaneously with variable size and variable position, wherein each of the plurality of video containers is capable of simultaneously displaying respective video content from one of the plurality of source devices, independent of the size, position, and video content of the other video containers; wherein a video content displayable in a background video container comprises the graphical user interface, and wherein the media processing unit is configured to control the size and position of each of the other video containers on the background container in response to control instructions of the web-based application, which control instructions comprise at least one of programmed instructions of the web-based application and user interactions with the graphical user interface.

2. The video display system of claim 1, wherein the web-based application runs in a web browser of the network computing device.

3. The video display system of claim 2, wherein the web-based application is one of an HTML, HTML5, javascript, java, adobe, and adobe flash application.

4. The video display system of claim 1, wherein the web-based application is a native application running on the network computing device.

5. The video display system of claim 1, wherein the network computing device is one of a personal computer, a laptop computer, a tablet, and a smart phone.

6. The video display system of claim 1, wherein the graphical user interface is mirrored in a computing device separate from the television for control of the size and position of at least one of the plurality of video containers in response to user commands to the mirrored graphical user interface.

7. The video display system of claim 1, wherein the media processing unit comprises a FPGA that is reconfigurable.

8. The video display system of claim 1, wherein the television is a 4K television.

9. The video display system of claim 1, wherein the graphical user interface also controls the selection of content for at least one of the plurality of video containers displayable on the television in response to user commands.

10. The video display system of claim 1, wherein the media processing unit comprises:
    a transcoder module configured to receive content from each of the plurality of source devices and configured to output a video signal in the HDMI format;
    a formatting module in communication with the transcoder module, the formatting module configured to instruct the transcoder module as to which of the plurality of source device content to present in which one of the plurality of video containers, and as to the form of the presentation on the display device of each of the plurality of video containers in response to programmed instructions or user commands; and
    a streaming module in communication with the transcoder module and the communications network, the streaming module configured to receive the formatted video signal output from the transcoder module, and to output the video signal as a streaming data output to the television.

11. The video display system of claim 10 wherein the formatting module is configured to resize the content of each of the plurality of video source devices to display within a respective one of the plurality of video containers.

12. The video display system of claim 1, wherein a video container is resized or repositioned based on activity detected by the web-based application.

13. The video display system of claim 1, wherein the background video container displays one or more widgets.

14. The video display system of claim 1 further comprising a plurality of audio devices, each of the plurality of audio devices in communication with the media processing unit, each of the plurality of audio devices configurable to select and provide an audio output of a video content from one of the plurality of video containers, the audio device capable of changing the audio output to correspond to any one of the plurality of video containers in near real-time.

15. The video display system of claim 1, further including a separate input device for providing control commands to the graphical user interface.

16. The video display system of claim 15, wherein the input device is one associated with a respective one of the plurality of content source devices.

17. The video display system of claim 15, wherein the input device is one of a third party control device and a device associated with the network computing device.

18. The video display system of claim 1, further including a plurality of input devices, each of the input devices under the control of a respective user for controlling a respective one of the plurality of video containers.

19. A video display system comprising:
    a computerized media processing unit configured to receive video content from each of a plurality of different source devices including at least one of a cable set top box, a satellite set top box, a gaming station, a streaming video set top box, and a DVD player, and at least one network computing device configured to run a web-based application that provides internet video content to the media processing unit, provides a graphical user interface for the video display system, and provides control instructions to the media processing unit, the media processing unit configured to aggregate and blend different selected video content and generate as output the blended video content as a video signal in a format which is receivable by a television;

wherein the video signal output by the media processing unit comprises a plurality of video containers all displayable on the television simultaneously with variable size and variable position, wherein each of the plurality of video containers is capable of simultaneously displaying respective video content selected from one of the plurality of source devices, independent of the size, position, and video content of the other video containers; and wherein the media processing unit is configured to control the size and position of each of the video containers on the television in response to control instructions of the web-based application, which control instructions comprise at least one of programmed instructions of the web-based application and user interactions with the graphical user interface.

20. The video display system of claim 19, wherein the video content displayable in a respective one of the plurality of video containers may comprise a portion of the video content from the respective source device up to the entirety of the video content from that source device.

21. A video display system comprising:
a television;
a network computing device for running a web-based application that provides a graphical user interface for the video display system and access to internet video content; and
a computerized media processing unit configured to receive video content from each of a plurality of different source devices, wherein one of the plurality of source devices is the network computing device for providing control instructions to the media processing unit via the web-based application, the media processing unit configured to aggregate and blend different video content from the different source devices and generate as output the blended video content as a single video signal in an HDMI format which is receivable by the television;
wherein the video signal output by the media processing unit comprises a plurality of video containers all displayable on the television simultaneously with variable size and variable position, wherein each of the plurality of video containers is capable of simultaneously displaying respective video content from one of the plurality of source devices, independent of the size, position, and video content of the other video containers, and wherein the media processing unit is configured to control the size and position of each video container on the television in response to control instructions of the web-based application, which control instructions comprise at least one of programmed instructions of the web-based application and user interactions with the graphical user interface.

* * * * *